US006710335B2

(12) United States Patent
Ellson et al.

(10) Patent No.: US 6,710,335 B2
(45) Date of Patent: *Mar. 23, 2004

(54) ACOUSTIC SAMPLE INTRODUCTION FOR ANALYSIS AND/OR PROCESSING

(75) Inventors: Richard N. Ellson, Palo Alto, CA (US); Mitchell W. Mutz, Palo Alto, CA (US)

(73) Assignee: Picoliter Inc., Sunnyvale, CA (US)

(*) Notice: Subject to any disclaimer, the term of this patent is extended or adjusted under 35 U.S.C. 154(b) by 84 days.

This patent is subject to a terminal disclaimer.

(21) Appl. No.: 10/066,546

(22) Filed: Jan. 30, 2002

(65) Prior Publication Data

US 2002/0125424 A1 Sep. 12, 2002

Related U.S. Application Data

(63) Continuation-in-part of application No. 09/784,705, filed on Feb. 14, 2001, now Pat. No. 6,603,118.

(51) Int. Cl.[7] .......................... H01J 49/04; G01N 1/10; G01N 35/10

(52) U.S. Cl. ....................... 250/288; 436/180; 422/100; 422/63; 435/30; 73/864; 73/864.81

(58) Field of Search ......................... 250/288; 436/180; 422/63, 100; 435/30; 73/864, 864.81

(56) References Cited

U.S. PATENT DOCUMENTS

| | | | | |
|---|---|---|---|---|
| 4,308,547 A | | 12/1981 | Lovelady et al. | |
| 4,751,529 A | | 6/1988 | Elrod et al. | |
| 5,306,412 A | * | 4/1994 | Whitehouse et al. | 250/288 |
| 5,520,715 A | | 5/1996 | Oeftering | |
| 5,722,479 A | | 3/1998 | Oeftering | |
| 5,808,636 A | | 9/1998 | Stearns | |
| 5,877,580 A | * | 3/1999 | Swierkowski | 310/328 |
| 6,503,454 B1 | * | 1/2003 | Hadimioglu et al. | 422/100 |
| 2002/0037579 A1 | | 3/2002 | Ellson et al. | |
| 2002/0094582 A1 | * | 7/2002 | Williams et al. | 436/180 |

FOREIGN PATENT DOCUMENTS

| | | | |
|---|---|---|---|
| EP | 0434931 | A2 | 7/1991 |

OTHER PUBLICATIONS http://www.coming.com/lifesciences/products_services/microplate_equipment_compatibility_guide/1536well_plate_clear_2_μl asp.*

U.S. patent application Ser. No. 09/669,267, Ellson, filed Sep. 25, 2000.

U.S. patent application Ser. No. 09/669,996, Ellson et al., filed Sep. 25, 2000.

U.S. patent application Ser. No. 09/669,997, Mutz et al., filed Sep. 25, 2000.

U.S. patent application Ser. No. 09/823,890, Lee, filed Mar. 30, 2001.

* cited by examiner

*Primary Examiner*—Jack Berman
(74) *Attorney, Agent, or Firm*—Reed & Eberle LLP; Louis L. Wu

(57) ABSTRACT

The invention relates to the efficient transport of a small volume of fluid, such as may be required by mass spectrometers and other devices configured to process and/or analyze small samples of biomolecular fluids. Such transport involves nozzleless acoustic ejection. In some instances, sample molecules contained in droplets of fluid are introduced from a reservoir into an ionization chamber of an analytical device. In other instances, sample molecules are introduced into a small capillary by directing focused acoustic radiation at a focal point near the surface of a fluid sample. In still other instances, acoustic ejection is used to form an array on a surface, wherein the features of the array are ionized for analysis. The invention may be used with microfluidic devices. Thus, the invention facilitates the processing and/or analysis of various types of samples, such as biomolecules having high molecular weights.

108 Claims, 4 Drawing Sheets

ACOUSTIC SAMPLE INTRODUCTION FOR ANALYSIS AND/OR PROCESSING

CROSS-REFERENCE TO RELATED APPLICATIONS

This is a continuation-in-part of U.S. patent application Ser. No. 09/784,705, filed Feb. 14, 2001 now U.S. Pat. No. 6,603,118, the disclosure of which is incorporated by reference herein.

TECHNICAL FIELD

This invention relates generally to devices and methods for introducing a small quantity of a fluid sample into a sample vessel such as an ionization chamber, a capillary tube or a microfluidic device. More particularly, the invention relates to the use of nozzleless acoustic ejection to form and deliver droplets from a reservoir containing a small amount of fluid such as a microplate well, a capillary or a microfluidic device into a sample vessel for analysis and/or processing. The invention is particularly useful in mass spectrometry.

BACKGROUND

In the fields of genomics and proteomics, there is a need to manipulate, analyze and/or process minute quantities of sample materials. For example, microfluidic devices have been used as chemical analytic tools as well as means for introducing samples into clinical diagnostic tools. Their small channel size allows for the analysis of minute quantities of sample, which is an advantage where the sample is expensive or rare. However, microfluidic devices suffer from a number of unavoidable design limitations and drawbacks with respect to sample handling. For example, the flow characteristics of fluids in the small flow channels of a microfluidic device often differ from the flow characteristics of fluids in larger devices, as surface effects come to predominate and regions of bulk flow become proportionately smaller. Thus, in order to control sample flow, the surfaces of such devices must be adapted according to the particular sample to provide motive force to drive the sample through the devices. This means that a certain amount of sample waste must occur due to wetting of the device surfaces. Another limitation of microfluidic devices is the difficulty and expense of replicating the performance of some sophisticated chemical analytical instruments or chemical processing device within the microfluidic device. In these cases, it would be beneficial to have a method to remove a sample from the microfluidic device and load it directly into a more conventional analytical instrument or chemical reactor.

Surface wetting is a source of sample waste in other fluid delivery systems as well. For example, capillaries, Eppendorf-type or otherwise, having a small interior channel are often employed for sample fluid handling by submerging their tips into a pool of sample. In order to provide sufficient mechanical strength for handling, such capillaries must have a large wall thickness as compared to the interior channel diameter. Since any wetting of the exterior capillary surface results in sample waste, the high wall thickness to channel diameter ratio exacerbates sample waste. In addition, the sample pool has a minimum required volume driven not by the sample introduced into the capillary but rather by the need to immerse the large exterior dimension of the capillary. As a result, the sample volume required for capillary submersion may be more than an order of magnitude larger than the sample volume transferred into the capillary. Moreover, if more than one sample is introduced into a capillary, the previously immersed portions of the capillary surface must be washed between sample transfers in order to eliminate cross contamination. Cross contamination may result in a memory effect wherein spurious signals from a previous sample compromise data interpretation. In order to eliminate the memory effect, increased processing time is required to accommodate the washings between sample introductions.

Thus, there is a need in the art for techniques for manipulating minute amounts of fluids in conjunction with established analytical techniques. Mass spectrometry is a well-established analytical technique used for such analysis. In this technique, sample molecules are ionized and the resulting ions are sorted by mass-to-charge ratio. For sample molecules contained in a fluid sample, the sample fluid is typically converted into an aerosol that undergoes desolvation, vaporization, atomization, excitation, and ionization in order to form analyte ions.

For fluid samples, sample introduction is a critical factor that determines the performance of mass spectrometers, electrophoretic devices, and other analytical instruments. Analyzing the elemental constituents of a fluid sample may require the sample to be dispersed into a spray of small droplets or loaded in a predetermined quantity. A combination of a nebulizer and a spray chamber is commonly used for sample introduction, wherein the nebulizer produces the spray of droplets, and the droplets are then forced through a spray chamber and sorted by size and trajectory. Such droplets may be produced through a number of methods, such as those that employ ultrasonic energy and/or use a nebulizing gas. Such nebulizers, however, provide little control over the distribution of droplet size and no meaningful control over the trajectory of the droplets. As a result, the yield of droplets having a desired size and trajectory is low. In addition, the sample molecule may be adsorbed in the nebulizer, and large droplets may condense on the walls of the spray chamber. Such systems thus suffer from low analyte transport efficiency and high sample consumption.

Mass spectrometry has also been employed for samples that have been prepared as an array of features on a substrate. Matrix-Assisted Laser Desorption Ionization (MALDI), for example, is an ionization technique for large and/or labile biomolecules, such as nucleotidic and peptidic oligomers, polymers, and dendrimers, as well as for non-biomolecular compounds such as fullerenes. MALDI is considered a "soft" ionizing technique in which both positive and negative ions are produced. The technique involves depositing a small volume of sample fluid containing an analyte on a substrate comprised of a photon-absorbing matrix material. The sample fluid typically contains a solvent and the analyte. Once solvent has been evaporated from the substrate, the analyte remains on the substrate at the location where the sample fluid is deposited. Photons from a laser strike the substrate at the location of the analyte and, as a result, ions and neutral molecules are desorbed from the substrate. Notably, the substrate matrix material is selected to provide enhanced desorption performance.

Surface Enhanced Laser Desoprtion Ionization (SELDI) is another example of a surface-based ionization technique that allows for high-throughput mass spectrometry. Typically, SELDI is used to analyze complex mixtures of proteins and other biomolecules. SELDI employs a chemically reactive surface such as a "protein chip" to interact with analytes, e.g., proteins, in solution. Such surfaces selectively interact with analytes and immobilize them thereon. Thus, analytes can be partially purified on the chip and then quickly analyzed in the mass spectrometer. By providing different reactive moieties at different sites on a substrate surface, throughput may be increased.

It should be evident, then, that sample preparation for surface-based ionization devices requires accurate and precise placement of carefully metered amounts of sample fluids on a substrate surface in order to reduce sample waste. Waste reduction is an important concern when sample fluids are expensive or difficult to obtain. In particular, certain biomolecular samples, e.g., nucleotidic and peptidic sample molecules, are exceptionally expensive. Thus, sample deposition on to a substrate often involves the use of small Eppendorf-type capillaries. These capillaries, of course, suffer from the disadvantages as discussed above.

Accordingly, it is desired to provide a device that requires only small volumes of sample to effect efficient sample delivery into analytical devices such as mass spectrometers and capillaries, that does not lead to compromised analysis due to the above-described memory effect, and that does not require long washing times.

A number of patents present different techniques for sample ionization and delivery. For example, U.S. Pat. No. 5,306,412 to Whitehouse et al. describes an apparatus that applies mechanical vibrations to an outlet port of an electrospray tip to enhance electrostatic dispersion of sample solutions into small, highly charged droplets, resulting in the production of ions of solute species for mass spectrometric analysis. The technology disclosed in this patent purports to overcome the problems associated with inkjet technology for sample ionization and delivery. The patent discloses that, due to plugging problems with nozzle orifices smaller than about 10 μm, the techniques used in inkjet printing are not practical for the production of droplets in the size range required for efficient ion production in the mass spectrometric analysis of solutions. In addition, it is also disclosed that a single small orifice diameter associated with inkjet printers would not be effective over the flow rates associated with sample introduction in electrospray mass spectrometry. Like other electrospray systems, the described apparatus is disclosed to produce droplets of appropriate size but lacks control over the trajectory of droplets as they depart from the electrospray tip.

A number of patents relate to the use of acoustic energy in printing. For example, U.S. Pat. No. 4,308,547 to Lovelady et al. describes a liquid drop emitter that utilizes acoustic principles for ejecting liquid from a body of liquid onto a moving document for forming characters or bar codes thereon. Lovelady et al. is directed to a nozzleless inkjet printing apparatus wherein controlled drops of ink are propelled by an acoustical force produced by a curved transducer at or below the surface of the ink. In contrast to inkjet printing devices, nozzleless fluid ejection devices as described in the aforementioned patent are not subject to clogging and the disadvantages associated therewith, e.g., misdirected fluid or improperly sized droplets. In other words, nozzleless fluid delivery provides high fluid-delivery efficiency through accurate and precise droplet placement. Nozzleless fluid ejection also provides a high level of control over ejected droplet size.

While nozzleless fluid ejection has generally been limited to ink printing applications, it is not completely unknown in the field of ionized fluid delivery. U.S. Pat. Nos. 5,520,715 and 5,722,479, each to Oeftering, describe an apparatus for manufacturing a freestanding solid metal part through acoustic ejection of charged molten metal droplets. The apparatus employs electric fields to direct the charged droplets to predetermined points on a target where the droplets are solidified as a result of cooling. It should be readily evident that the apparatus disclosed in these patents employs acoustic ejection for metallic part synthesis rather than for biomolecular analysis. In addition, a high temperature is required in order to melt most metal samples, and such an apparatus would be incompatible with samples that decompose or are otherwise adversely affected by exposure to high temperatures.

Thus, there is a need in the art for improved sample preparation and introduction that employs acoustic ejection to deliver a small quantity of a fluid sample with accuracy, precision, and efficiency.

SUMMARY OF THE INVENTION

Accordingly, it is an object of the present invention to provide devices and methods that overcome the above-mentioned disadvantages of the prior art. One embodiment of the invention relates to a device having a sample vessel for processing and/or analyzing a sample molecule. The analytical device also includes an acoustic ejector for introducing the sample molecule from a reservoir holding a fluid sample comprised of sample molecule. The ejector comprises an acoustic radiation generator for generating acoustic radiation and a focusing means for focusing the acoustic radiation at a focal point near the surface of the fluid sample. Furthermore, a means for positioning the ejector in acoustic coupling relationship to the reservoir is provided. When the sample vessel is an ionization chamber, the analytical device, for example, may be a time-of-flight mass spectrometer that allows analysis of various types of sample molecules, such as biomolecules having a high molecular weight. In addition, the sample vessel may either comprise a microfluidic device or represent a portion of a microfluidic device.

Typically, the inventive devices allow for droplet ejection from a small volume of fluid. For instance, the fluid sample may occupy a volume in the picoliter range, and the ejected droplets may occupy a volume in the femtoliter range. Moreover, acoustic ejection allows precise and accurate control over droplet trajectory.

Another embodiment of the invention relates to a method for introducing a sample molecule into a sample vessel of a device for processing an/or analyzing a sample molecule. The inventive method provides for a reservoir holding a fluid sample comprised of the sample molecule and employs focused acoustic radiation directed at a point near the surface of the fluid sample to eject a droplet of the fluid sample therefrom along a predetermined trajectory into the sample vessel of the device. The method allows for accuracy and precision in the formation and placement of ejected droplets such that the ejected droplets may be substantially identical in size and follow substantially identical trajectories. As before, the sample vessel may be an ionization chamber or a microfluidic device.

Still another embodiment of the invention relates to an analytical device having an sample vessel for processing and/or analyzing a plurality of sample molecules. The device includes a plurality of reservoirs each holding a fluid sample comprised of a sample molecule, an ejector comprising an acoustic radiation generator for generating acoustic radiation and a focusing means for focusing the acoustic radiation at a focal point near the surface of the fluid sample, and a means for positioning the ejector in acoustic coupling relationship to each of the reservoirs to eject a droplet of fluid sample into the sample vessel. In some cases, the reservoirs are arranged in an array, such as in the case where the reservoirs comprise designated sites on a single flat substrate surface. Preferably, a means for altering the spatial relationship of at least one reservoir with respect to the ionization chamber is also provided.

In a further embodiment, the invention relates to a method for introducing fluid samples into a sample vessel of a device of processing and/or analyzing a sample molecule. The method involves: (a) providing a plurality of reservoirs each holding a fluid sample having a fluid surface; (b) positioning an ejector in acoustically coupled relationship to a selected reservoir; (c) activating the ejector to generate acoustic radiation having a focal point near the fluid surface of the fluid sample held in the selected reservoir to eject a droplet of fluid sample into the sample vessel; and (d) optionally repeating steps (b) and (c) for an additional reservoir. Typically, the method allows for locating the fluid surface of the fluid sample held by the selected reservoir before ejecting one or more droplets from the reservoir. The surface of the fluid sample may be located by detecting for reflected acoustic radiation from the fluid sample. Optionally, acoustic reflections may be used to align the acoustic focus with the opening of the ionization chamber or capillary.

Thus, the invention also provides a method for preparing a plurality of sample molecules for analysis. Such preparation involves applying focused acoustic energy to each of a plurality of fluid-holding reservoirs, each of said reservoirs holding sample molecules in a fluid to be applied to a designated site on the substrate surface in order to prepare an array comprised of a plurality of sample molecules on a substrate surface. Once the array is prepared, sufficient energy is successively applied to each site to ionize the sample molecules and release the sample molecules from the substrate surface for analysis. The energy may be applied, e.g., by bombarding the sites with acoustic energy, photons, electrons, and/or ions.

Furthermore, the invention provides a method for preparing a sample surface for analysis. The method involves first placing a sample surface in droplet-receiving relationship to a fluid-holding reservoir holding an analysis-enhancing fluid. Then, focused acoustic energy is applied in a manner effective to eject a droplet of the analysis-enhancing fluid from the reservoir such that the droplet is deposited on the sample surface at a designated site. Finally, the sample is subjected to conditions sufficient to allow the analysis-enhancing fluid to interact with the sample surface to render the substrate surface at the designated site suitable for analysis. Optionally, sufficient energy is applied to the designated site to ionize the sample surface and to release sample molecules from the substrate surface for analysis.

In another embodiment, the invention relates to a device useful for the efficient transport of a fluid sample. The device comprises a sample vessel having an inlet opening with a limiting dimension of no more than about 300 μm, a reservoir holding a fluid sample having a volume of no more than about 5 μL, and an ejector configured to eject at least about 25% of the fluid sample through the inlet opening into the sample vessel. Typically, the ejector comprises an acoustic radiation generator for generating radiation, a focusing means for directing the radiation at a focal point near the surface of the fluid sample, and a means for positioning the ejector in acoustic coupling relationship to the reservoir. Optionally, the ejector does not directly contact the radiation generator. The efficiency of this device lies in the ability of the device to handle extremely small fluid samples with little or no sample waste. Similarly, another embodiment of the invention relates to a method for the efficient transport of a droplet of a fluid sample, wherein a reservoir is provided holding a fluid sample having a volume of no more than about 5 μL, and at least 25% of the fluid sample is ejected through an inlet opening of a sample vessel, the inlet opening having a limiting dimension of no more than about 300 μm.

In a still further embodiment, a device for efficient transport of a fluid sample is provided. The device comprises: a sample vessel having an inlet opening with a limiting dimension of no more than about 10 μm to about 300 μm; a reservoir holding a fluid sample having a depth of about 0.1 to about 30 times the limiting dimension of the inlet opening; and an ejector configured to eject a droplet of the fluid sample through the inlet opening into the sample vessel. The sample vessel of the device does not contact the fluid sample held by the reservoir.

In yet another embodiment, a device for efficient transport of a fluid sample is provided, comprising: a sample vessel having an inlet opening with a limiting dimension; a reservoir holding a fluid sample having a depth of about 0.1 to about 30 times the limiting dimension of the inlet opening; and an acoustic ejector. The acoustic ejector is configured to eject a droplet of the fluid sample through the inlet opening into the sample vessel and comprises an acoustic radiation generator for generating acoustic radiation having a predetermined wavelength in the fluid sample selected according to the limiting dimension of the inlet opening of the sample vessel or the depth of the fluid sample and a focusing means for focusing the acoustic radiation at a focal point near the surface of the fluid sample, wherein the acoustic ejector is in acoustic coupling relationship to the reservoir.

In a further embodiment, the invention relate to an apparatus for ejecting a fluid droplet from a microfluidic device. A microfluidic device is provided comprising a base having a microchannel formed in a surface thereof, and a cover plate arranged over the base surface. The cover plate in combination with the microchannel defines a microconduit, and the microconduit fluidly communicates with an inlet opening and an outlet opening. An ejector is also provided comprising an acoustic radiation generator for generating acoustic radiation, and a focusing means for focusing the acoustic radiation at a focal point near the surface of a fluid at the outlet opening of the microfluidic device. A positioning means serves to position the ejector in acoustic coupling relationship to the microfluidic device to eject a droplet from the outlet opening of the microfluidic device.

In still another embodiment, a method is provided for ejecting a fluid droplet from a microfluidic device. A microfluidic device is provided comprising a base having a microchannel formed in a surface thereof, and a cover plate arranged over the base surface. As above, the cover plate in combination with the microchannel defines a microconduit, and the microconduit fluidly communicates with an inlet opening and an outlet opening. When focused acoustic radiation is directed at a point near the surface of a fluid at the outlet opening of the microfluidic device, a droplet of the fluid is ejected from the outlet opening of the microfluidic device.

BRIEF DESCRIPTION OF THE DRAWINGS

The invention is described in detail below with reference to the following drawings, wherein like reference numerals indicate a corresponding structure throughout the several views.

FIG. 2A illustrates acoustic coupling of an acoustic ejector to a fluid sample on a first designated site on a substrate. FIG. 2B illustrates the same device wherein the substrate is moved such that the ejector is acoustically coupled to another fluid sample on a second designated site on the substrate.

DETAILED DESCRIPTION OF THE INVENTION

Definitions and Overview

Figure 1:
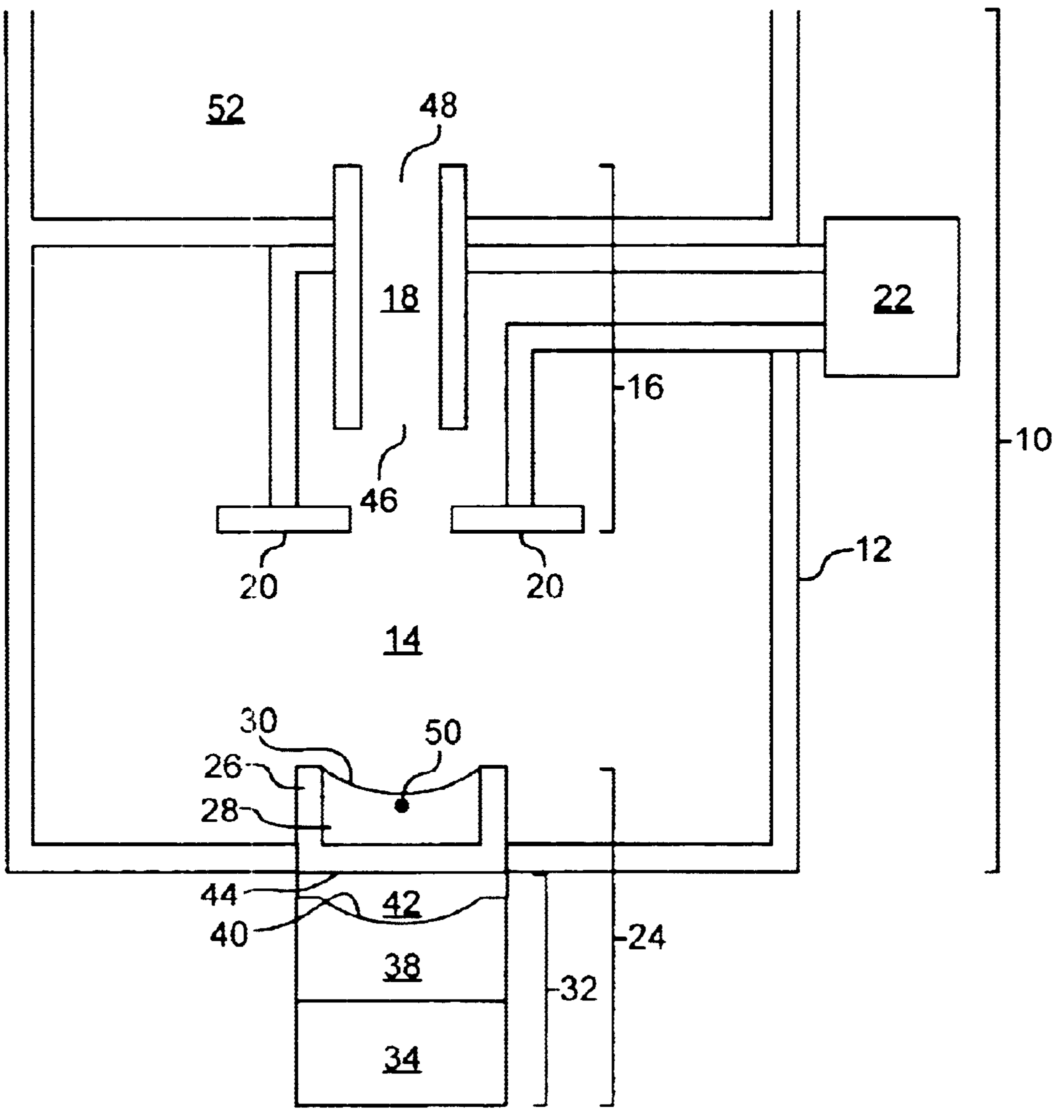
FIG. 1 illustrates in cross-sectional schematic view a first embodiment of a device having an ionization chamber that employs acoustic ejection for fluid sample delivery.

Before describing the present invention in detail, it is to be understood that this invention is not limited to specific fluids, biomolecules, or device structures, as such may vary. It is also to be understood that the terminology used herein is for the purpose of describing particular embodiments only, and is not intended to be limiting.

It must be noted that, as used in this specification and the appended claims, the singular forms "a," "an," and "the" include both singular and plural referents unless the context clearly dictates otherwise. Thus, for example, reference to "a reservoir" includes a plurality of reservoirs as well as a single reservoir, reference to "a fluid" includes a plurality of fluids as well as single fluid, reference to "a biomolecule" includes a combination of biomolecules as well as single biomolecule, and the like.

In describing and claiming the present invention, the following terminology will be used in accordance with the definitions set out below.

The terms "acoustic coupling" and "acoustically coupled" as used herein refer to a state wherein an object is placed in direct or indirect contact with another object so as to allow acoustic radiation to be transferred between the objects without substantial loss of acoustic energy. When two items are indirectly acoustically coupled, an "acoustic coupling medium" is needed to provide an intermediary through which acoustic radiation may be transmitted. Thus, an ejector may be acoustically coupled to a fluid, e.g., by immersing the ejector in the fluid or by interposing an acoustic coupling medium between the ejector and the fluid to transfer acoustic radiation generated by the ejector through the acoustic coupling medium and into the fluid.

The term "adsorb" as used herein refers to the noncovalent retention of a molecule by a substrate surface. That is, adsorption occurs as a result of noncovalent interaction between a substrate surface and adsorbing moieties present on the molecule that is adsorbed. Adsorption may occur through hydrogen bonding, van der Waal's forces, polar attraction, or electrostatic forces (i.e., through ionic bonding). Examples of adsorbing moieties include, but are not limited to, amine groups, carboxylic acid moieties, hydroxyl groups, nitroso groups, sulfones, and the like.

The term adsorb is commonly used in the context of substrate or sample surfaces. The substrate or sample surface commonly may be functionalized with adsorbent moieties to interact in a certain manner, as when the surface is functionalized with amino groups to render it positively charged in a pH-neutral aqueous environment. Likewise, adsorbate moieties may be added in some cases to effect adsorption, as when a basic protein is fused with an acidic peptide sequence to render adsorbate moieties that can interact electrostatically with a positively charged adsorbent moiety.

The term "array" as used herein refers to a two-dimensional arrangement of features, such as an arrangement of reservoirs (e.g., wells in a well plate) or an arrangement of fluid droplets or molecular moieties on a substrate surface (as in an oligonucleotide or peptide array). Arrays are generally comprised of features regularly ordered in, for example, a rectilinear grid, parallel stripes, spirals, and the like, but non-ordered arrays may be advantageously used as well. An array differs from a pattern in that patterns do not necessarily contain regular and ordered features. Neither arrays nor patterns formed using the devices and methods of the invention have optical significance to the unaided human eye. For example, the invention does not involve ink printing on paper or other substrates in order to form letters, numbers, bar codes, figures, or other inscriptions that are readable to the unaided human eye. In addition, arrays and patterns formed by the deposition of ejected droplets on a surface as provided herein are preferably substantially invisible to the unaided human eye. Arrays typically but do not necessarily comprise at least about 4 to about 10,000,000 features, generally in the range of about 4 to about 1,000,000 features.

The term "attached," as in, for example, a substrate surface having a molecular moiety "attached" thereto, includes covalent binding, adsorption, and physical immobilization. The terms "binding" and "bound" as used herein are identical in meaning to the term "attached."

The terms "biomolecule" and "biological molecule" are used interchangeably herein to refer to any organic molecule, whether naturally occurring, recombinantly produced, or chemically synthesized in whole or in part, that is, was, or can be a part of a living organism. The terms encompass, for example, nucleotides, amino acids, and monosaccharides, as well as oligomeric and polymeric species such as oligonucleotides and polynucleotides, peptidic molecules such as oligopeptides, polypeptides and proteins, polysaccharides such as disaccharides, oligosaccharides, mucopolysaccharides, and peptidoglycans (peptido-polysaccharides), and the like. The term also encompasses ribosomes, enzyme cofactors, pharmacologically active agents, and the like.

The terms "library" and "combinatorial library" are used interchangeably herein to refer to a plurality of chemical or biological moieties present on the surface of a substrate, wherein each moiety is different from each other moiety. The moieties may be, e.g., peptidic molecules and/or oligonucleotides.

The term "moiety" as used herein refers to any particular composition of matter, e.g., a molecular fragment, an intact molecule (including a monomeric molecule, an oligomeric molecule, or a polymer), or a mixture of materials (for example, an alloy or a laminate).

It will be appreciated that, as used herein, the terms "nucleoside" and "nucleotide" refer to nucleosides and nucleotides containing not only the conventional purine and pyrimidine bases, i.e., adenine (A), thymine (T), cytosine (C), guanine (G), and uracil (U), but also protected forms thereof, e.g., wherein the base is protected with a protecting group such as acetyl, difluoroacetyl, trifluoroacetyl, isobutyryl, or benzoyl, and purine and pyrimidine analogs. Suitable analogs will be known to those skilled in the art and are described in the pertinent texts and literature. Common analogs include, but are not limited to, 1-methyladenine, 2-methyladenine, $N^6$-methyladenine, $N^6$-isopentyladenine, 2-methylthio-$N^6$-isopentyladenine, N,N-dimethyladenine, 8-bromoadenine, 2-thiocytosine, 3-methylcytosine, 5-methylcytosine, 5-ethylcytosine, 4-acetylcytosine, 1-methylguanine, 2-methylguanine, 7-methylguanine, 2,2-dimethylguanine, 8-bromoguanine, 8-chloroguanine, 8-aminoguanine, 8-methylguanine, 8-thioguanine, 5-fluorouracil, 5-bromouracil, 5-chlorouracil, 5-iodouracil, 5-ethyluracil, 5-propyluracil, 5-methoxyuracil, 5-hydroxymethyluracil, 5-(carboxyhydroxymethyl)uracil, 5-(methylaminomethyl)uracil, 5-(carboxymethylaminomethyl)-uracil, 2-thiouracil, 5-methyl-2-thiouracil, 5-(2-bromovinyl)uracil, uracil-5-oxyacetic acid, uracil-5-oxyacetic acid methyl ester, pseudouracil, 1-methylpseudouracil, queosine, inosine, 1-methylinosine, hypoxanthine, xanthine, 2-aminopurine, 6-hydroxyaminopurine, 6-thiopurine, and 2,6-diaminopurine. In addition, the terms "nucleoside" and "nucleotide" include those moieties that contain not only conventional ribose and deoxyribose sugars, but other sugars as well. Modified nucleosides or nucleotides also include modifications on the sugar moiety, e.g., wherein one or more of the hydroxyl groups are replaced with halogen atoms or aliphatic groups, or are functionalized as ethers, amines, or the like.

As used herein, the term "oligonucleotide" is generic to polydeoxynucleotides (containing 2-deoxy-D-ribose), to polyribonucleotides (containing D-ribose), to any other type of polynucleotide that is an N-glycoside of a purine or pyrimidine base, and to other polymers containing non-nucleotidic backbones (for example PNAs), providing that the polymers contain nucleobases in a configuration that allows for base pairing and base stacking, such as are found in DNA and RNA. Thus, these terms include known types of oligonucleotide modifications, for example, substitution of one or more of the naturally occurring nucleotides with an analog; internucleotide modifications such as, for example, those with uncharged linkages (e.g., methyl phosphonates, phosphotriesters, phosphoramidates, carbamates, etc.), with negatively charged linkages (e.g., phosphorothioates, phosphorodithioates, etc.), and with positively charged linkages (e.g., aminoalklyphosphoramidates, aminoalkylphosphotriesters); those containing pendant moieties such as, for example, proteins (including nucleases, toxins, antibodies, signal peptides, poly-L-lysine, etc.), those with intercalators (e.g., acridine, psoralen, etc.), and those containing chelators (e.g., metals, radioactive metals, boron, oxidative metals, etc.). There is no intended distinction in polymer length between the terms "polynucleotide" and "oligonucleotide," and these terms will be used interchangeably. These terms refer only to the primary structure of the molecule. As used herein, the symbols for nucleotides and polynucleotides are according to the IUPAC-IUB Commission of Biochemical Nomenclature recommendations (*Biochemistry* 9:4022, 1970).

The terms "peptide," "peptidyl," and "peptidic" as used throughout the specification and claims are intended to include any structure comprised of two or more amino acids. For the most part, the peptides in the present arrays comprise about 5 to 10,000 amino acids, preferably about 5 to 1000 amino acids. The amino acids forming all or a part of a peptide may be any of the twenty conventional, naturally occurring amino acids, i.e., alanine (A), cysteine (C), aspartic acid (D), glutamic acid (E), phenylalanine (F), glycine (G), histidine (H), isoleucine (I), lysine (K), leucine (L), methionine (M), asparagine (N), proline (P), glutamine (Q), arginine (R), serine (S), threonine (T), valine (V), tryptophan (W), and tyrosine (Y). Any of the amino acids in the peptidic molecules forming the present arrays may be replaced by a non-conventional amino acid. In general, conservative replacements are preferred. Conservative replacements substitute the original amino acid with a non-conventional amino acid that resembles the original in one or more of its characteristic properties (e.g., charge, hydrophobicity, stearic bulk; for example, one may replace Val with Nval). The term "non-conventional amino acid" refers to amino acids other than conventional amino acids, and includes, for example, isomers and modifications of the conventional amino acids (e.g., D-amino acids), non-protein amino acids, post-translationally modified amino acids, enzymatically modified amino acids, constructs or structures designed to mimic amino acids (e.g., α,α-disubstituted amino acids, N-alkyl amino acids, lactic acid, β-alanine, naphthylalanine, 3-pyridylalanine, 4-hydroxyproline, O-phosphoserine, N-acetylserine, N-formylmethionine, 3-methylhistidine, 5-hydroxylysine, and norleucine), and peptides having the naturally occurring amide —CONH— linkage replaced at one or more sites within the peptide backbone with a non-conventional linkage such as N-substituted amide, ester, thioamide, retropeptide (—NHCO—), retrothioamide (—NHCS—), sulfonamido (—$SO_2$NH—), and/or peptoid (N-substituted glycine) linkages. Accordingly, the peptidic molecules of the array include pseudopeptides and peptidomimetics. The peptides of this invention can be (a) naturally occurring, (b) produced by chemical synthesis, (c) produced by recombinant DNA technology, (d) produced by biochemical or enzymatic fragmentation of larger molecules, (e) produced by methods resulting from a combination of methods (a) through (d) listed above, or (f) produced by any other means for producing peptides The term "capillary" is used herein to refer to a conduit having a bore of small dimension. Typically, capillaries for electrophoresis that are free standing tubes have an inner diameter in the range of about 50 to about 250 μm. Capillaries with extremely small bores integrated to other devices, such as openings for loading microchannels of microfluidic devices, can be as small as 1 μm, but in general these capillary opening are in the range of about 10 to about 100 μm. In the context of delivery to a mass analyzer in electrospray-type mass spectrometry, the inner diameter of capillaries may range from about 0.1 to about 3 mm and preferably about 0.5 to about 1 mm. In some instances, a capillary can represent a portion of a microfluidic device. In such instances, the capillary may be an integral or affixed (permanently or detachably) portion of the microfluidic device.

The term "fluid" as used herein refers to matter that is nonsolid or at least partially gaseous and/or liquid. A fluid may contain a solid that is minimally, partially, or fully solvated, dispersed, or suspended. Examples of fluids include, without limitation, aqueous liquids (including water per se and salt water) and nonaqueous liquids such as organic solvents and the like. As used herein, the term "fluid" is not synonymous with the term "ink" in that an ink must contain a colorant and may not be gaseous.

The terms "focusing means" and "acoustic focusing means" refer to a means for causing acoustic waves to converge at a focal point by either a device separate from the acoustic energy source that acts like an optical lens, or by the spatial arrangement of acoustic energy sources to effect convergence of acoustic energy at a focal point by constructive and destructive interference. A focusing means may be as simple as a solid member having a curved surface, or it may include complex structures such as those found in Fresnel lenses, which employ diffraction in order to direct acoustic radiation. Suitable focusing means also include phased array methods as known in the art and described, for example, in U.S. Pat. No. 5,798,779 to Nakayasu et al. and Amemiya et al. (1997) *Proceedings of the* 1997 *IS&T NIP*13 *International Conference on Digital Printing Technologies*, pp. 698–702.

The term "ion" is used in its conventional sense to refer to a charged atom or molecule, i.e., an atom or molecule that contains an unequal number of protons and electrons. Positive ions contain more protons than electrons, and negative ions contain more electrons than protons. Ordinarily, an ion of the present invention is singly charged, but may in certain instances have a multiple charge.

Accordingly, the term "ionization chamber" as used here refers to a chamber in which ions are formed from samples, fluid or otherwise, containing a sample molecule.

The "limiting dimension" of an opening refers herein to the maximum theoretical diameter of a sphere that can pass through an opening without deformation. For example, the limiting dimension of a circular opening is the diameter of the opening. As another example, the limiting dimension of a rectangular opening is the length of the shorter side of the rectangular opening. The opening may be present on any solid body including, but not limited to, sample vessels, substrates, capillaries, microfluidic devices, and ionization chambers. Depending on the purpose of the opening, the opening may represent an inlet and/or an outlet.

The term "microfluidic device" refers to a device having fluid-transporting features of micrometer or submicrometer dimensions in which any number of processes and or analytical techniques involving very small amounts of fluid may be carried out. Such processes and analytical techniques include, but are not limited to, separation (e.g., electrophoresis and chromatography), screening and diagnostics (e.g., using hybridization or other binding means), and chemical and biochemical synthesis (e.g., DNA amplification as may be conducted using the polymerase chain reaction, or "PCR"), and analysis (e.g., through enzymatic digestion). Typically, microfluidic devices comprise a base on or in which the fluid transporting features are formed. The features of the microfluidic devices are adapted to the particular use intended. Fluid may be transported through the fluid-transporting feature through the use of mechanical forces, e.g., through the appropriate use of vacuums, pumps, syringes, etc., or through the controlled application of an electric field to induce fluid flow and/or to provide flow switching voltage, e.g., through use of electrophoresis.

The term "fluid-tight" is used herein to describe the spatial relationship between two solid surfaces in physical contact such that fluid is prevented from flowing into the interface between the surfaces.

The term "fluid-transporting feature" as used herein refers to an arrangement of solid bodies or portions thereof that direct fluid flow. Fluid-transporting features include, but are not limited to, chambers, reservoirs, conduits, and channels. The term "conduit" as used herein refers to a three-dimensional enclosure formed by one or more walls and having an inlet opening and an outlet opening through which fluid may be transported. The term "channel" is used herein to refer to an open groove or a trench in a surface. A channel in combination with a solid piece in fluid-tight contact over the channel forms a conduit.

The term "near," as used herein refers to the distance from the focal point of the focused acoustic radiation to the surface of the fluid from which a droplet is to be ejected, indicates that the distance should be such that the focused acoustic radiation directed into the fluid results in droplet ejection from the fluid surface; and that one of ordinary skill in the art will be able to select an appropriate distance for any given fluid using straightforward and routine experimentation. Generally, however, a suitable distance between the focal point of the acoustic radiation and the fluid surface is in the range of about 1 to about 15 times the wavelength of the speed of sound in the fluid, more typically in the range of about 1 to about 10 times that wavelength, preferably in the range of about 1 to about 5 times that wavelength.

The term "nonmetallic" refers herein to sample molecules that are not substantially purely metallic. Thus, for example, the term may be used to refer to compounds that contain metals such as organometallics and salts such as sodium chloride, but may not be used to refer to alloys such as brass.

"Optional" or "optionally" means that the subsequently described circumstance may or may not occur, so that the description includes instances where the circumstance occurs and instances where it does not.

The term "reservoir" as used herein refers a receptacle or chamber for holding or containing a fluid. Thus, a fluid in a reservoir necessarily has a free surface, i.e., a surface that allows a droplet to be ejected therefrom. A reservoir may also be a locus on a substrate surface within which a fluid is constrained. In some instances, a reservoir may represent a portion, e.g., a fluid-transporting feature of a microfluidic device.

The term "substantially" as in, for example, the phrase "substantially identical volume," refers to volumes that do not deviate by more than 10%, preferably 5%, more preferably 1%, and most preferably at most 0. 1%, from each other. Other uses of the term "substantially" involve an analogous definition.

The term "substrate" as used herein refers to any material having a surface onto which one or more fluids may be deposited. The substrate may be constructed in any of a number of forms such as wafers, slides, well plates, and membranes, for example. In addition, the substrate may be porous or nonporous as may be required for deposition of a particular fluid. Suitable substrate materials include, but are not limited to, supports that are typically used for solid phase chemical synthesis, e.g., polymeric materials (e.g., polystyrene, polyvinyl acetate, polyvinyl chloride, polyvinyl pyrrolidone, polyacrylonitrile, polyacrylamide, polymethyl methacrylate, polytetrafluoroethylene, polyethylene, polypropylene, polyvinylidene fluoride, polycarbonate, divinylbenzene styrene-based polymers), agarose (e.g., Sepharose®), dextran (e.g., Sephadex®), cellulosic polymers and other polysaccharides, silica and silica-based materials, glass (particularly controlled pore glass, or "CPG") and functionalized glasses, ceramics, and such substrates treated with surface coatings, e.g., with microporous polymers (particularly cellulosic polymers such as nitrocellulose), microporous metallic compounds (particularly microporous aluminum), antibody-binding proteins (available from Pierce Chemical Co., Rockford Ill.), bisphenol A polycarbonate, or the like.

Substrates of particular interest are porous, and include, as alluded to above:

uncoated porous glass slides, including CPG slides; porous glass slides coated with a polymeric coating, e.g., an aminosilane or poly-L-lysine coating, thus having a porous polymeric surface; and nonporous glass slides coated with a porous coating. The porous coating may be a porous polymer coating, such as may be comprised of a cellulosic polymer (e.g., nitrocellulose) or polyacrylamide, or a porous metallic coating (for example, comprised of microporous aluminum). Examples of commercially available substrates having porous surfaces include the Fluorescent Array Surface Technology (FAST™) slides available from Schleicher & Schuell, Inc. (Keene, N.H.), which are coated with a 10–30 μm thick porous, fluid-permeable nitrocellulose layer that substantially increases the available binding area per unit area of surface. Other commercially available porous substrates include the CREATIVECHIP® permeable slides currently available from Eppendorf AG (Hamburg, Germany), and substrates having "three-dimensional" geometry, by virtue of an ordered, highly porous structure that enables reagents to flow into and penetrate through the pores and channels of the entire structure. Such substrates are available from Gene Logic, Inc. under the tradename "Flow-Thru Chip," and are described by Steel et al. in Chapter 5 of *Microarray Biochip Technology* (BioTechniques Books, Natick, Mass., 2000).

The term "porous," as in a "porous substrate" or a "substrate having a porous surface," refers to a substrate or surface, respectively, having a porosity (void percentage) in the range of about 1% to about 99%, preferably about 5% to about 99%, more preferably in the range of about 15% to about 95%, and an average pore size of about 100 Å to about 1 mm, typically about 500 Å to about 0.5 mm.

The term "impermeable" is used in the conventional sense to mean not permitting water or other fluids to pass through. The term "permeable" as used herein means not "impermeable." Thus, a "permeable substrate" and a "substrate having a permeable surface" refer to a substrate or surface, respectively, which can be permeated with water or other fluid.

While the foregoing support materials are representative of conventionally used substrates, it is to be understood that a substrate may in fact comprise any biological, nonbiological, organic, and/or inorganic material, and may be in any of a variety of physical forms, e.g., particles, strands, precipitates, gels, sheets, tubing, spheres, containers, capillaries, pads, slices, films, plates, and the like, and may further have any desired shape, such as a disc, square, sphere, circle, etc. The substrate surface may or may not be flat, e.g., the surface may contain raised or depressed regions. A substrate may additionally contain or be derivatized to contain reactive functionalities that covalently link a compound to the substrate surface. These are widely known and include, for example, silicon dioxide supports containing reactive Si-OH groups, polyacrylamide supports, polystyrene supports, polyethylene glycol supports, and the like.

The term "surface modification" as used herein refers to the chemical and/or physical alteration of a surface by an additive or subtractive process to change one or more chemical and/or physical properties of a substrate surface or a selected site or region of a substrate surface. For example, surface modification may involve (1) changing the wetting properties of a surface, (2) functionalizing a surface, i.e., providing, modifying, or substituting surface functional groups, (3) defunctionalizing a surface, i.e., removing surface functional groups, (4) otherwise altering the chemical composition of a surface, e.g., through etching, (5) increasing or decreasing surface roughness, (6) providing a coating on a surface, e.g., a coating that exhibits wetting properties that are different from the wetting properties of the surface, and/or (7) depositing particulates on a surface.

The term "sample vessel" as used herein refers to any hollow or concave receptacle having a structure that allows for sample processing and/or analysis. Thus, a sample vessel has an inlet opening through which sample may be introduced and an optional, but preferred, outlet opening through which processed or analyzed sample may exit.

In general, the invention relates to the efficient transport and/or deposition of a small amount of fluid such as that which may be required by devices configured to process and/or analyze biomolecular samples. Such transport and/or deposition of fluid typically involve nozzleless acoustic ejection. The fluid may either contain sample molecules or a substance that enhances molecular analysis. The invention is particularly useful in the context of microfluidics and mass spectrometry, but may be adapted for use in other contexts as well.

Thus, one embodiment of the invention relates to a device having a sample vessel for processing and/or analyzing a sample molecule wherein the molecule is introduced using an acoustic ejector for introducing the sample molecule from a reservoir holding a fluid sample comprised of the sample molecule. The ejector comprises an acoustic radiation generator for generating acoustic radiation and a focusing means for focusing the acoustic radiation at a focal point near the surface of the fluid sample. Furthermore, a means for positioning the ejector in acoustic coupling relationship to the reservoir is provided. When the sample vessel is an ionization chamber, the analytical device, for example, may be a time-of-flight mass spectrometer that allows analysis of various types of sample molecules, such as biomolecules having a high molecular weight. In addition, the sample vessel may either comprise a microfluidic device or represent a portion of a microfluidic device.

FIG. 1 schematically illustrates an electrospray ionization chamber of a mass spectrometer that incorporates the invention. As is the case with all figures contained herein, FIG. 1 is not necessarily to scale, and certain dimensions may be exaggerated for clarity of presentation. The ionization chamber 10 comprises a housing 12 containing an ionization region 14, preferably operated substantially at or near atmospheric pressure, a vacuum interface 16 comprising a capillary 18 and an electrode 20 for attracting ions towards the vacuum interface 16, and optionally a drying gas source 22. An ejector assembly 24 is also provided that includes a reservoir 26 containing a fluid sample 28 having a fluid surface 30 in the ionization chamber 10. The ejector assembly 24 also includes an acoustic ejector 32 comprised of an acoustic radiation generator 34 for generating acoustic radiation, and a focusing means 38 for focusing the acoustic radiation at a focal point within the fluid from which a droplet is to be ejected, near the fluid surface. As shown in FIG. 1, the focusing means 38 may comprise a single solid piece having a concave surface 40 for focusing acoustic radiation, but the focusing means may be constructed in other ways as discussed below. The acoustic ejector 32 is acoustically coupled to the reservoir 26 and thus to fluid sample 28. The acoustic radiation generator 34 and the focusing means 38 may function as a single unit controlled by a single controller (not shown), or they may be independently controlled, depending on the desired performance of the device.

As discussed above, the inventive device is typically constructed to handle small amounts of sample fluid. Most often, the inventive device is constructed for analysis of nonmetallic sample molecules. In such a case, the sample molecule may be an organic compound. When the organic compound is a biomolecule, it is often the case with nucleotidic and peptidic moieties that a sample may have a wide range of molecular weights, e.g., about 100 daltons to about 100 kilodaltons. The inventive device is particularly suitable for sample molecules having a molecular weight of about 1 to about 100 kilodaltons. In addition, the sample molecules are often provided in aqueous solutions. In the case of rare or expensive fluid samples, the inventive device may employ fluid sample volumes of less than about 100 μL. In some circumstances, the fluid sample may occupy a volume of no more than about 10 μL. Preferably, the fluid sample occupies a volume of no more than about 1 μL. Optimally, the fluid sample occupies a volume of about 10 pL to about 100 nL.

As will be appreciated by those skilled in the art, any of a variety of focusing means may be employed in conjunction with the present invention. In addition, there are a number of ways to acoustically couple the ejector 32 to the reservoir and thus to the fluid therein. Thus, various means for positioning the ejector in acoustic coupling relationship to the reservoir are generally known in the art and may involve, e.g., devices that provide movement having one, two, three, four, five, six or more degrees of freedom. The design and construction of acoustic ejector assemblies are also described, e.g., in U.S. patent application Ser. No. 09/669,996. Optimally, acoustic coupling is achieved between the ejector and the reservoir through indirect contact, as illustrated in FIG. 1. In the figure, an acoustic coupling medium 42 is placed between the ejector 32 and the base 44 of reservoir 26, with the ejector and reservoir located at a predetermined distance from each other. The acoustic coupling medium 42 may be an acoustic coupling fluid, preferably an acoustically homogeneous material in conformal contact with both the acoustic focusing means and the reservoir. In addition, it is important to ensure that the fluid medium is substantially free of material having different acoustic properties than those of the fluid medium itself. As shown, the reservoir 26 is acoustically coupled to the acoustic focusing means 38 such that an acoustic wave generated by the acoustic radiation generator 34 is directed by the focusing means into the acoustic coupling medium, which then transmits the acoustic radiation into the reservoir.

The interface 16 is positioned relative to the ejector assembly to allow the ejector to acoustically eject droplets from the reservoir directly into the interface. A vacuum interface, as illustrated in FIG. 1, comprises a capillary with an inlet opening 46 and an exit 48, and optional means of introducing drying gas into the ionization chamber. The capillary is typically fabricated from glass and/or metal. As illustrated, all components of the vacuum interface are electrically connected.

The vacuum interface may be electrically connected with the housing of the ionization chamber and is typically operated at approximately ground potential, that is, at a voltage of between typically about −50 volts and about 50 volts, more preferably at a voltage of between about −10 volts and about 10 volts. The housing may be fabricated from any material that provides the requisite structural integrity and that does not significantly degrade, corrode, or outgas under typical conditions of use. Typical housings are fabricated from electrically conductive materials, including metals such as stainless steel, aluminum, and aluminum alloys. Parts of the housing may include nonconductive plastics, such as Delrin acetal resin (trademark of Du Pont) and Teflon fluorocarbon polymer (trademark of Du Pont). In addition, composite or multilayer materials may also be used.

In operation, the reservoir 26 of the ejector assembly is filled with the fluid sample 28, as shown in FIG. 1. The acoustic ejector is positioned so as to achieve acoustic coupling between the ejector 32 and the reservoir 26 through an acoustic coupling medium 42. The ejection assembly is operated such that a high voltage difference is generated between the sample 28 and the vacuum interface 16, the ejection assembly preferably at approximately ground potential. Means of supplying the low voltage to the ejection assembly typically include wires and electrical contacts. During operation, an electrical potential difference is generated between the electrode of the vacuum interface and the ejector on the order of about 1,000 volts to about 8,000 volts. As an alternative, the vacuum interface voltage may be at ground potential. As a further alternative, both the vacuum interface and the electrode may not be at ground potential yet still exhibit a high potential difference therebetween. In any case, one of ordinary skill in the art will recognize that a nonconductive acoustic coupling material may be selected to isolate the acoustic generator from high voltages that may be present at the reservoir. This may involve the use of highly deionized water or fluids with low electrical conductivity. Examples of nonaqueous fluids with low electrical conductivity include, but are not limited to, alkanes, fluorinated alkanes, silicones, and other nonpolar organic solvents.

With reference to FIG. 1, once the ejector 32, the reservoir 26, and the inlet opening 46 are in proper alignment, the acoustic radiation generator 34 is activated to produce acoustic radiation that is directed by the focusing means 38 to a focal point 50 near the fluid surface 30 of the reservoir 26. As a result, a droplet is ejected from the fluid surface into the interface 16. The ionization region 14 within the ionization chamber 10 is optionally operated substantially at or near atmospheric pressure, that is, preferably between about 660 torr and about 860 torr, more preferably at or about 760 torr. The temperature within the ionization chamber is typically from about 20° C. to about 100° C. Operation at ambient temperature is convenient and suitable for many applications. The droplets ejected are charged under the influence of the electric field generated within the ionization chamber due to the potential difference between the ejection assembly 24 and the vacuum interface 16. That is, the electrode 20 of the vacuum interface 16 locally charges the surface 30 of the fluid sample 28 from which the droplets are ejected. As a result, the droplets are also charged. The charged droplets are then evaporated and desolvated by heating or under the influence of drying gas introduced into the ionization chamber. The ions are induced to exit the ionization region 14 via an inlet opening 46 of the capillary 18, by application of an electrical potential to electrode 20. The ions entering the vacuum interface subsequently enter into a vacuum region 52 that contains a mass analyzer or detector, not shown. Examples of such mass analyzers include multipole detectors such as quadruple detectors that employ a charged surface that attracts or repels the ionized sample molecule.

Similarly, other charged surfaces may be placed in the ionization chamber to direct the trajectory of ionized droplets. In other words, the trajectory of ejected droplets may intersect one or more electric fields. To further ensure controlled ion delivery, the ejector is configured to eject small droplets having a substantially identical volume. Small droplet size allows for rapid desolvation. Uniform droplet volume leads to reproducible analyses. Typically, the volume of each ejected droplet does not exceed about 1 nL. Preferably, the volume of each ejected droplet is no more than about 1 pL. In some cases, the ejector may be configured to eject a droplet having a volume of no more than about 100 femtoliters. In addition, in some cases, the ejector may be configured to eject no more than about 5 percent of the fluid sample per droplet. Thus, by repeatably applying the same acoustic energy to a fluid surface, droplets having substantially identical sizes and trajectories can be ejected.

In another embodiment, the invention pertains to a device having a sample chamber for processing and/or analyzing a sample molecule, wherein the molecule is introduced using an acoustic ejector that introduces the sample molecule from a plurality of reservoirs each holding a fluid sample comprised of sample molecules. The ejector comprises an acoustic radiation generator for generating acoustic radiation and a focusing means for focusing the acoustic radiation at a focal point near the surface of the fluid sample. Furthermore, a means for positioning the ejector in acoustic coupling relationship to the reservoirs is provided.

FIG. 2 schematically illustrates another electrospray ionization chamber of a mass spectrometer. The ionization chamber 10 comprises a housing 12, and a vacuum interface 16 comprising an opening 18 through a plate 20. An ejector assembly 24 is also provided that includes a substantially planar reservoir plate 26 having flat parallel opposing surfaces, indicated at 54 and 56, the upper surface 54 having a plurality of designated sites thereon, indicated at 58 and 60, the sites representing reservoirs containing fluid samples, indicated at 28 and 62, that have fluid surfaces 30 and 64, respectively. In other words, the reservoirs are provided as integrated members of a single reservoir plate wherein the reservoirs comprise designated sites on a surface of the reservoir plate. As shown, the reservoirs are arranged in an array. The ejector assembly 24 also includes an acoustic ejector 32 comprised of an acoustic radiation generator 34 for generating acoustic radiation and a focusing means 38 for focusing the acoustic radiation at a focal point within the fluid from which a droplet is to be ejected near the fluid surface. The focusing means 38 is shown comprising a single solid piece having a concave surface 40 for focusing acoustic radiation. The acoustic ejector 32 is acoustically coupled to the reservoir plate 26 through its lower surface 56. Thus, by proper positioning of the ejector to each designated site, the ejector can be coupled to each fluid sample.

Alternatively, commercially available well plates may also be employed as reservoirs for the present invention. Such well plates may, for example, comprise 96, 384, 1536, or 3456 reservoirs. Manufactures of such well plates include Corning Inc. (Corning, N.Y.) and Greiner America, Inc. (Lake Mary, Fla.). The wells of these well plates are typically arranged in rectilinear arrays wherein each interior well has four closest neighbors.

In some instances, the reservoirs may represent a portion of a microfluidic device, as discussed below. Microfluidic devices are available from ACLARA BioSciences, Inc. (Mountain View, Calif.), Caliper Technologies Corp. (Mountain View, Calif.), and Fluidigm Corp. (South San Francisco, Calif.). The combined employment of focused acoustic ejection and microfluidic devices are discussed in greater detail below.

Figure 2A:
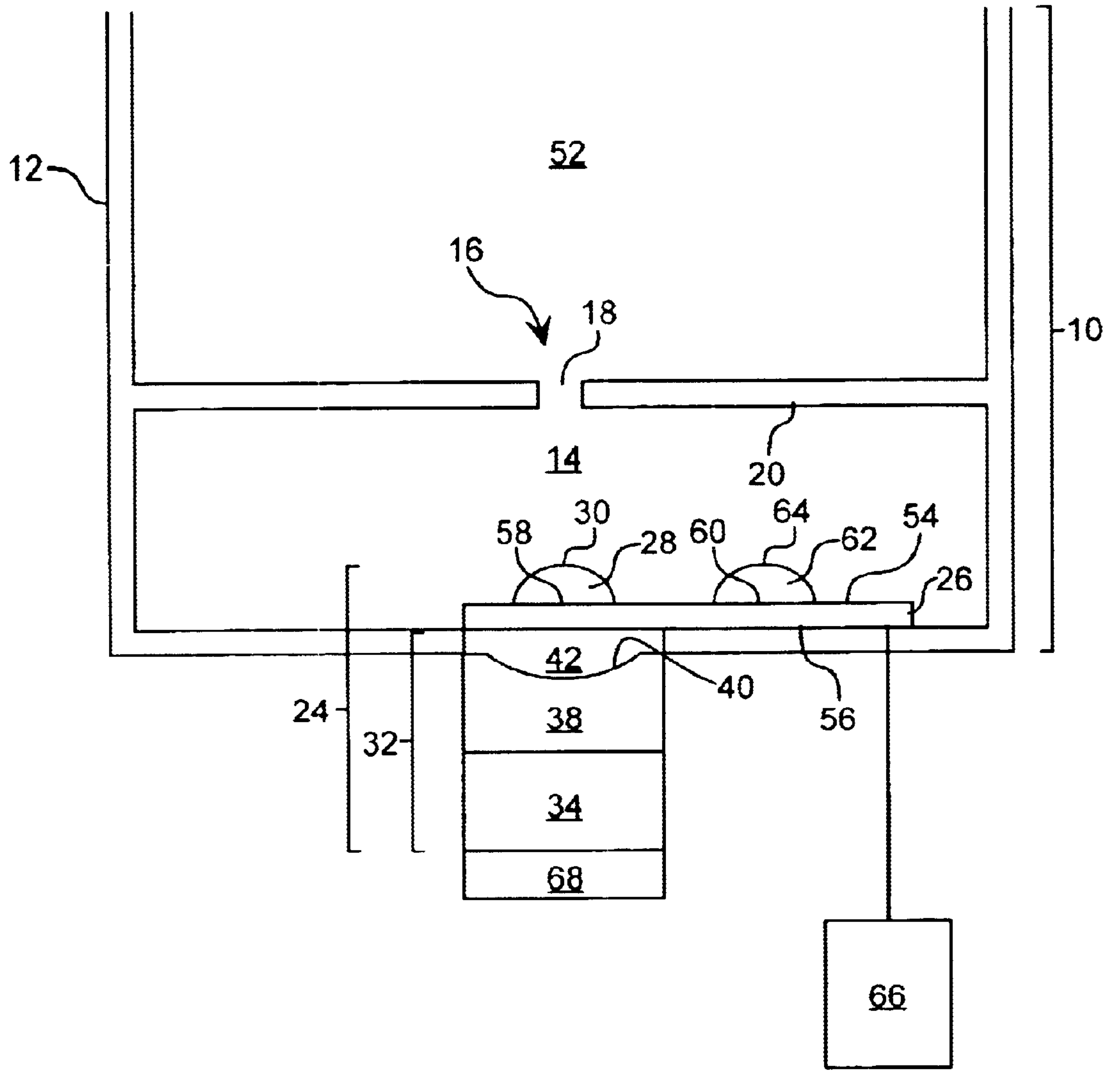
FIGS. 2A and 2B, collectively referred to as FIG. 2, illustrate in cross-sectional schematic view another embodiment of a device having an ionization chamber that employs acoustic ejection to deliver a plurality of fluid samples for analysis.

As shown in FIG. 2A, acoustic coupling is achieved between the ejector 32 and a reservoir 58 by indirect contact through an acoustic coupling medium 42 interposed between the ejector 32 and the lower surface 56 of the reservoir plate 26, with the ejector 32 and reservoir plate 26 located at a predetermined distance from each other. The relative position of the interface 12 with respect to the ejector assembly 32 is situated to allow the ejector to acoustically eject droplets from the reservoir plate 26 directly into the interface opening 18.

In operation, each reservoir of the device is filled with a fluid sample, as shown in FIG. 2. This can be done by using any reservoir-filling technologies known in the art, including, but not limited to, pipettes, syringes, and inkjet print heads. Acoustic ejection as described in U.S. patent application Ser. No. 09/727,392 represents a particularly suitable method for filling the reservoirs. In addition, a charging means 66, such as an electrostatic generator, provides electrical contact with the reservoir plate 26 to add or subtract electrons thereto in order to electrostatically charge the sample 28 in a reservoir 58. The construction of such electrostatic charge generators is known in the art. When all reservoirs are electrically connected, all fluid samples may be simultaneously charged. However, depending on the construction of the electrostatic generator and the reservoirs, the fluid samples also may be charged in succession, e.g., as droplets are ejected in succession from the reservoirs.

In order to eject droplets from the reservoirs 58, 60 in succession, the ejector must be positioned in acoustic coupling relationship with the reservoirs. However, in order to ensure that the droplets follow the desired trajectory, the ejector, the reservoirs, and the interface must be precisely and accurately aligned. Such alignment can be performed through a number of techniques. For example, the designated sites on the reservoir plate may be marked so as to identify the location of the sites at which acoustic coupling may take place. In addition, since the acoustic properties of the designated sites are different from the other portions of the reservoir plate, it is preferred that the device further comprises an acoustic detector 68 for detecting reflected acoustic radiation from the fluid samples. Such a detector may be configured to provide information relating to the position and orientation of the fluid surface from which droplets may be ejected. That is, when the reservoir plate is acoustically coupled to the acoustic radiation generator, the generator is activated to produce a detection acoustic wave that travels through the reservoir plate, and if a fluid surface is present, the wave is reflected thereby as a reflected acoustic wave. In other words, the radiation generator in combination with the focusing means can function as an acoustic microscope as well as a drop generator. Parameters of the reflected acoustic radiation are then analyzed in order to assess the spatial relationship between the acoustic radiation generator and the fluid surface. Such an analysis at a minimum may be used to detect whether a fluid is present and may be expanded to determine the distance between the acoustic radiation generator and the fluid surface and/or the orientation of the fluid surface in relationship to the acoustic radiation generator.

More particularly, the acoustic radiation generator may be activated so as to generate low energy acoustic radiation that is insufficiently energetic to eject a droplet from the fluid surface. This is typically done by using an extremely short pulse (on the order of tens of nanoseconds) relative to that normally required for droplet ejection (on the order of microseconds). By determining the time it takes for the acoustic radiation to be reflected by the fluid surface back to the acoustic radiation generator and then correlating that time with the speed of sound in the fluid, the distance-and thus the fluid height-may be calculated. Of course, care must be taken in order to ensure that acoustic radiation reflected by the interface between the reservoir base and the fluid is discounted. It will be appreciated by those of ordinary skill in the art that such a method employs conventional or modified sonar techniques.

Once the analysis has been performed, an ejection acoustic wave having a focal point near the fluid surface is generated in order to eject at least one droplet of the fluid, wherein the optimum intensity and directionality of the ejection acoustic wave is determined using the aforementioned analysis optionally in combination with additional data. The "optimum" intensity and directionality are generally selected to produce droplets of consistent size and velocity. For example, the desired intensity and directionality of the ejection acoustic wave may be determined by using not only the spatial relationship assessed as above, but also geometric data associated with the reservoir, fluid property data associated with the fluid to be ejected, and/or by using historical droplet ejection data associated with the ejection sequence. In addition, the data may show the need to reposition the acoustic radiation generator with respect to the fluid surface, in order to ensure that the focal point of the ejection acoustic wave is near the fluid surface, where desired. For example, if analysis reveals that the acoustic radiation generator is positioned such that the ejection acoustic wave cannot be focused near the fluid surface, then the acoustic radiation generator is repositioned using vertical, horizontal, and/or rotational movement to allow appropriate focusing of the ejection acoustic wave.

Precision alignment between the acoustic ejector and the opening for the sample is particularly important if the size of the droplet approaches the size of the opening. Since, as discussed above, the combination of the acoustic radiation generator and acoustic focusing means can be used as an acoustic microscope; the combination, in some instances, thus can be used to locate the interface opening by sonar methods known to those versed in the art of acoustic microscopy. The acoustic coupling between the transducer and opening may not be sufficient to provide a strong enough reflection for the measurement in the specific configuration used for sample loading. The signal strength can be raised by a variety of methods including a change in frequency to one with less attenuation for the given acoustic path, the use of better acoustic coupling materials in the acoustic path, or a reduction in vertical distance between transducer and opening.

A processor could direct a motion system to change the relative position of the acoustic ejector and the interface opening to bring the acoustic generator and the opening into proper alignment. Achievement of the proper position can be verified by acoustic means. Usually, the proper position to insure that the trajectory of drops emitted from the reservoir will enter the opening is a co-axial alignment (centerline of transducer being co-linear with centerline of opening). Factors other than the initial velocity vector contribute to the drop trajectory (such as droplet charge and local electric fields). Hence, a non-coaxial alignment may be required in order for drops emitted by the activation of the transducer to have a trajectory into the interior of the opening. The alignment for these situations can be either calculated or determined experimentally.

Figure 2B:
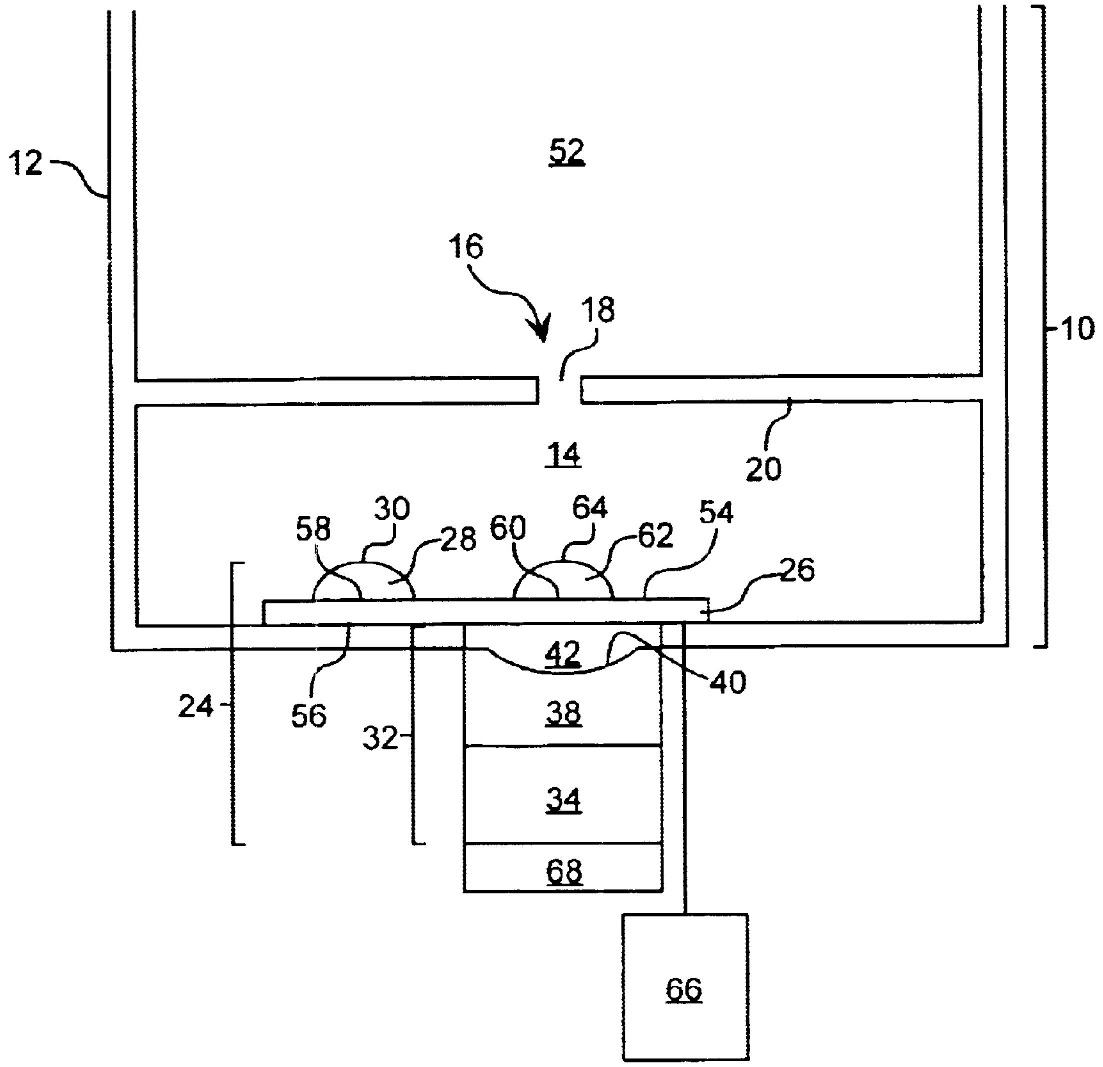

Thus, as shown in FIG. 2A, the acoustic ejector 32 is positioned below a reservoir 58 in order to achieve acoustic coupling between the ejector 32 and the reservoir through acoustic coupling medium 42. An acoustic detector 68 ensures that the reservoir 58 and the ejector 32 are properly aligned. Once the ejector 32, the reservoir 58, and the inlet opening are in proper alignment, the acoustic radiation generator 34 is activated to produce acoustic radiation that is directed by the focusing means to a focal point near the fluid surface of the reservoir. As a result, a droplet is ejected from the fluid surface into the vacuum interface opening 18. Then, as shown in FIG. 2B, the reservoir plate 26 is repositioned by a reservoir positioning means (not shown) and the ejection process is repeated such that the ejector is located below reservoir 60 to eject droplets therefrom. The charged droplets may then be evaporated and desolvated by heating or under the influence of drying gas introduced into the ionization chamber, as described above. The ions then travel through the vacuum interface opening 18 and enter into the vacuum region 52 that contains a mass analyzer or detector (not shown).

From the above, it is evident that it is sometimes advantageous to fix the relative position of the ejector with respect to the ionization chamber and to position the reservoirs accordingly in order to eject droplets from the reservoirs. However, the relative positions and spatial orientations of the various components may be altered depending on the particular desired task at hand. In such a case, the various components of the device may require individual control or synchronization to direct droplets into an ionization chamber. For example, the ejector positioning means may be adapted to eject droplets from each reservoir in a predetermined sequence associated with an array of reservoirs on the reservoir plate surface. Similarly, the reservoir plate positioning means for positioning the reservoir plate surface with respect to the ejector may be adapted to position the reservoir plate surface to ensure a proper droplet ejection sequence. Either or both positioning means, i.e., the ejector positioning means and the reservoir positioning means, may be constructed from, e.g., levers, pulleys, gears, a combination thereof, or other mechanical means known to one of ordinary skill in the art. It is preferable to ensure that there is a correspondence between the movement of the reservoir plate with respect to the activation of the ejector to ensure proper synchronization. It is to be understood that means for positioning the ejector in acoustic coupling relationship to the reservoirs may be equivalent to means for positioning the reservoirs in acoustic coupling relationship to the ejector.

The above-described devices may be adapted to eject fluids of virtually any type and amount desired. The fluid may be aqueous or nonaqueous. The capability of producing fine droplets of such materials is in sharp contrast to piezoelectric technology or ordinary inkjet technology, insofar as piezoelectric systems are susceptible to clogging and problems associated with clogging such as misdirected droplet trajectory and/or improper droplet size. Furthermore, because of the precision that is possible using the inventive technology, the device may be used to eject droplets from a reservoir adapted to hold no more than the above described fluid sample volumes.

In addition, the rate at which fluid droplets can be delivered is related to the efficiency of fluid delivery. For example, the invention generally enables ejection of droplets at a rate of at least about 1,000,000 droplets per minute from the same reservoir, and at a rate of at least about 100,000 drops per minute from different reservoirs, assuming that the droplet size does not exceed about 10 $\mu$m in diameter. One of ordinary skill in the art will recognize that the droplet generation rate is a function of drop size, viscosity, surface tension, and other fluid properties. In general, the droplet generation rate increases with decreasing droplet diameter, and 1,000,000 droplets per minute is achievable for most aqueous fluid drops under about 10 $\mu$m in diameter. In addition, current positioning technology allows for the ejector positioning means to move from one reservoir to another quickly and in a controlled manner, thereby allowing fast and controlled ejection of different fluid samples. That is, current commercially available technology allows the ejector to be moved from one reservoir to another, with repeatable and controlled acoustic coupling at each reservoir, in less than about 0.1 second for high performance positioning means and in less than about 1 second for ordinary positioning means. A custom designed system will allow the ejector to be moved from one reservoir to another with repeatable and controlled acoustic coupling in less than about 0.001 second. In order to provide a custom designed system, it is important to keep in mind that there are two basic kinds of motion: pulse and continuous. Pulse motion involves the discrete steps of moving an ejector into position, emitting acoustic energy, and moving the ejector to the next position; again, using a high performance positioning means with such a method allows repeatable and controlled acoustic coupling at each reservoir in less than 0.1 second. A continuous motion design, on the other hand, moves the ejector and the reservoirs continuously, although not at the same speed, and provides for ejection during movement. Since the pulse width is very short, this type of process enables over 10 Hz reservoir transitions, and even over 1000 Hz reservoir transitions.

It should also be evident that due to the capabilities of acoustic ejection, another embodiment of the invention relates to a device for the efficient transport of fluid samples. The device comprises a sample vessel having an inlet opening with a limiting dimension of no more than about 300 μm, a reservoir holding a fluid sample having a volume of no more than about 5 μL, and an ejector configured to eject at least about 25% of the fluid sample through the inlet opening into the sample vessel. Typically, the ejector comprises an acoustic radiation generator for generating radiation, a focusing means for directing the radiation at a focal point near the surface of the fluid sample, and a means for positioning the ejector in coupling relationship to the reservoir. Optionally, the ejector does not directly contact the radiation generator, in which case the device further comprises a coupling fluid interposed between the ejector and the reservoir for acoustic coupling as described above. Similarly, another embodiment of the invention relates to a method for the efficient transport of a droplet of a fluid sample, wherein a reservoir is provided containing a fluid sample having a volume of no more than about 5 μL, and at least 25% of the fluid sample is ejected in the form of individual droplets through an inlet opening of a sample vessel, the inlet opening having a limiting dimension of no more than about 300 μm, wherein the size of the droplets approaches the limiting dimension of the opening.

The efficiency of these embodiments lies in the ability to handle extremely small fluid samples with little or no sample waste. In these embodiments, then, the limiting dimension often does not exceed about 100 μm. Preferably, the limiting dimension does not exceed about 50 μm, and optimally, does not exceed about 20 μm. In addition, the reservoir volume may be no more than about about 1 μL, preferably no more than about 100 nL, and optimally no more than about 50 nL, and in some cases no more than about 500 pL. By controlling droplet size, droplet ejection may result in at least about 50% of the fluid, preferable at least about 75%, and optimally about 85% of the fluid sample passing through the inlet opening and into the sample vessel. Efficient droplet delivery also allows small vessels to be filled without reliance on surface wetting properties, though wetting may occur. This is particularly advantageous for sample vessels having an interior volume of no more than about 5 μL. In fact, it is likely that the present invention will allows sample vessels with extremely small interior volumes to be filled wherein the vessel volume is no more than about 1 μL, 100 nL, 50 nL, or even 500 pL.

Figure 3:
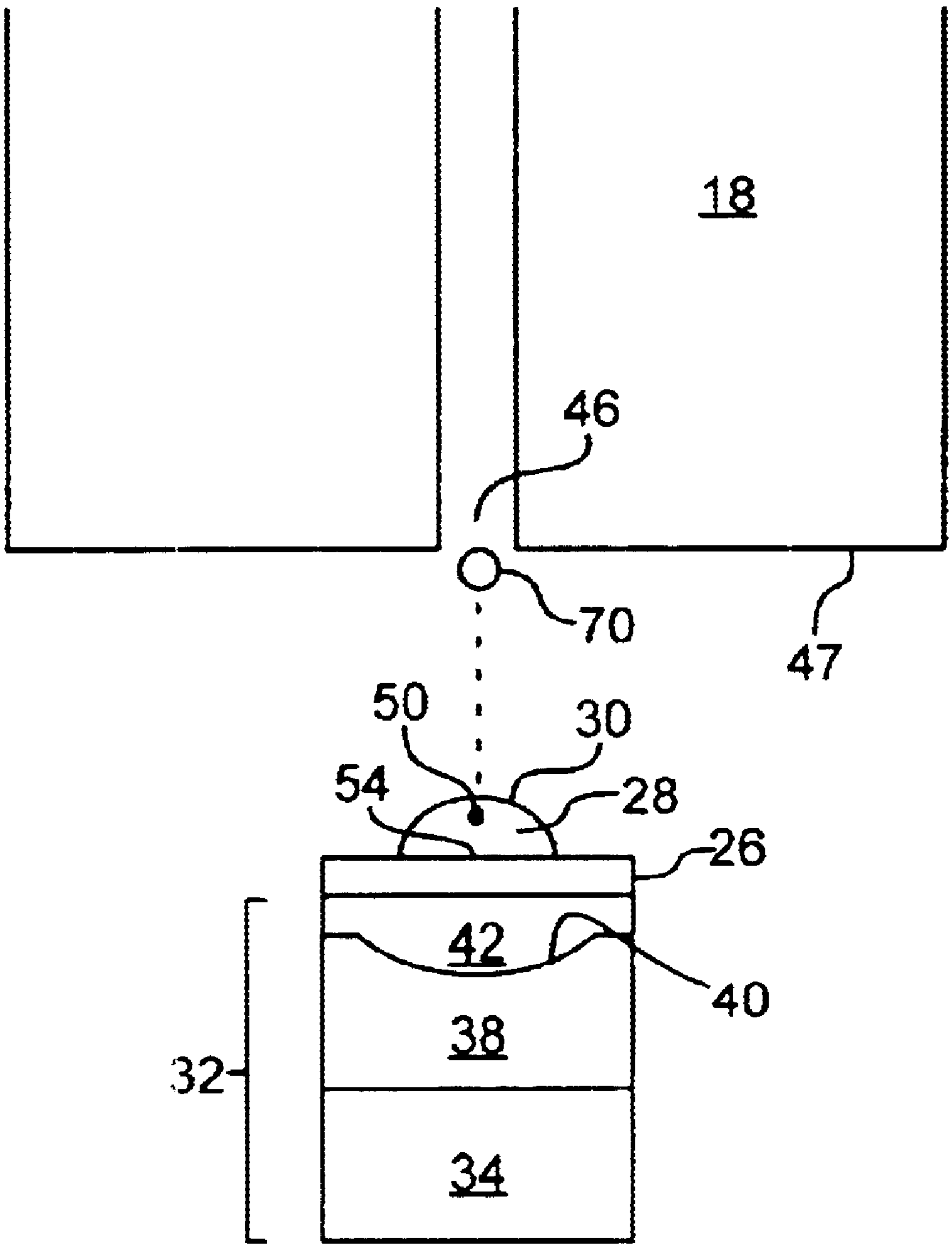
FIG. 3 illustrates in cross-sectional schematic view the ejection of droplets of fluid from a hemispherical fluid sample source on a substrate surface into an inlet opening disposed on a terminus of a capillary.

This embodiment may be adapted to improve sample introduction for any device with an inlet opening, and is illustrated in FIG. 3 wherein an axially symmetric capillary 18 having an inlet opening 46 disposed on a terminus 47 thereof is provided as a sample vessel. Due to the axial symmetry of the capillary 18, the inlet opening 46 has a circular cross sectional area. As such, the opening has a limiting dimension equal to its diameter. Due to the wall thickness of the capillary 18 with respect to the diameter of the inlet opening 46, it is evident that if the terminus 47 of the capillary 18 were submerged in a pool of fluid sample only a small portion of the fluid sample would be introduced into the interior of the capillary; the remainder would wet the exterior surface of the capillary terminus.

Thus, this embodiment provides for introduction of a small volume of fluid into a sample vessel having an opening with a small limiting dimension. Also shown in FIG. 3 is a hemispherical fluid sample 28 on a substantially flat substrate surface 54. The shape of the fluid sample 28 is a function of the sample wetting properties with respect to the substrate surface 54. Thus, the shape can be modified with any of a number of surface modification techniques. In addition, an ejector 32 is provided comprising an acoustic radiation generator 34 for generating radiation, and a focusing means 38 for directing the radiation at a focal point 50 near the surface 30 of the fluid sample 28. The ejector 32 is shown in acoustic coupling relationship to the substrate 26 through coupling fluid 42. Proper control of acoustic wavelength and amplitude results in the ejection of a droplet 70 from the fluid sample 28 on the substrate surface 54. As the droplet 70 is shown having a diameter only slightly smaller than the diameter of the inlet opening 46, it is evident that this configuration requires alignment of the ejector 32, the sample fluid 28, and the capillary 18, which can be achieved using techniques known in the art or described supra.

It should be apparent, then, that in another embodiment, a device for the efficient transport of a fluid sample is provided. The device comprises: a sample vessel having an inlet opening with a limiting dimension of no more than about 300 μm, wherein the limiting dimension is preferably about 10 μm to about 300 μm; a reservoir holding a fluid sample having a depth of about 0.1 to about 30 times the limiting dimension of the inlet opening; and an ejector configured to eject a droplet of the fluid sample through the inlet opening into the sample vessel. The sample vessel of the device does not contact the fluid sample held by the reservoir. Typically, the droplet has a diameter smaller than the limiting dimension of the inlet opening. In some cases, the limiting dimension of the inlet opening is at least about 3 μm greater than the diameter of the droplet. In addition, the limiting dimension of the inlet opening may be no more than about 100 times the diameter of the droplet.

The ejector of such a device is typically an acoustic ejector configured to eject a droplet of the fluid sample through the inlet opening into the sample vessel, comprising an acoustic radiation generator for generating acoustic radiation and a focusing means for focusing the acoustic radiation at a focal point near the surface of the fluid sample, and further wherein the acoustic ejector is in acoustic coupling relationship to the reservoir. Typically, the acoustic radiation generator is configured to generate a predetermined wavelength selected according to the limiting dimension of the inlet opening. The predetermined wavelength is typically no greater than the limiting dimension of the inlet opening and preferably no greater than about 80% of the limiting dimension of the inlet opening. In addition or in the alternative, the predetermined wavelength is selected according to the depth of the fluid sample. In such a case, the predetermined wavelength typically is no greater than about 80%, preferably no greater than 50% and optimally no greater than 25%, of the depth of the fluid sample.

In general, the predetermined wavelength can be determined by one of ordinary skill in the art upon routine experimentation and/or by reference to the pertinent literature. See, e.g., U.S. Pat. No. 4,751,529 to Elrod et al.

Thus, the above-described embodiments may be adapted to use focused acoustic energy to introduce a droplet of fluid into any sample vessel for processing and/or analyzing a sample molecule. The invention may also be used in any context where precise placement of a fluid droplet through an inlet opening is desirable or necessary. For example, a sample introduction interface of a mass spectrometer may have a substantially flat surface where the inlet open is located. In addition or in the alternative, mass spectrometers may employ an interface comprising an axially symmetric capillary having an inlet opening that provides access to the interior region of the capillary. Such capillaries may be electrically conductive or electrically insulating, or may contain both conductive and insulating portions. Such electrical properties are chosen according to desired electric fields for directing analyte ion trajectory.

In addition, the invention may be implemented to introduce samples into microfluidic devices. At a minimum, microfluidic devices typically comprise a substrate and a cover plate, the substrate having at least one microchannel formed in a surface thereof. When the cover plate is arranged over the base (substrate) surface, the cover plate in combination with the microchannel defines a microconduit in fluid communication with an inlet opening and an outlet opening. Microfluidic devices, as discussed above, represent a significant advancement in applications requiring the use of fluid that are difficult and/or expensive to obtain, e.g., proteomics and genomics. Typically, microfluidic systems miniaturize and automate a number of laboratory processes that are then integrated on a substrate or "chip," wherein each chip may contain a network of microscopic channels, chambers and the like through which fluids and chemicals are transported in order to perform a variety of experiments. Thus, microfluidic devices are particularly suited for the processing and/or analysis of minute sample quantities. As discussed above, microfluidic devices are available from ACLARA BioSciences, Inc. (Mountain View, Calif.), Caliper Technologies Corp. (Mountain View, Calif.), and Fluidigm Corp. (South San Francisco, Calif.).

Microfluidic devices are typically produced employing the same microfabrication methods that are used to make microchips in the computer industry, enabling the creation of intricate, minute patterns of interconnected channels. Once a pattern is created, microchip-manufacturing methods are employed to recreate the pattern design in a substrate base. This process allows for the precise manufacture and reproduction of channels, chambers and the like having dimensions that can be varied in their width and depth. Once the pattern is produced in the substrate, a cover plate is affixed, permanently or releasable, over the base. As noted above, microfluidic devices contain at least one inlet opening and at least one outlet opening that are in fluid communication with the one or more conduits contained within the microfluidic device. Because microfluidic devices may be constructed using simple manufacturing techniques, they are generally inexpensive to produce.

There are a number of inherent drawbacks and limitations in microfluidic device, many relating to sample introduction and flow control. Fluid flow characteristics within the small flow channels of a microfluidic device may differ from fluid behavior in larger devices, since surface effects tend to predominate, and regions of bulk flow become proportionately smaller. Thus, fluid movement in microfluidic devices sometimes involves electrokinetic flow, which is generated by electrodes in reservoirs at each end of a channel that are activated when an external power source applies a voltage across the electrodes. Under these conditions, fluids of the appropriate type will move by electroosmosis, a process that precisely and controllably generates linear flow rates within the channel, typically about a millimeter per second. Electrophoresis, another electrokinetic phenomenon, may also occur in the channels. This involves the movement of charged molecules or particles in an electric field.

Alternatively or in addition, external pressure can be applied to move fluid through the fluid-transporting features of microfluidic device. For example, U.S. Pat. No. 6,117,396 to Demers describes a device for delivering defined volumes of a liquid. The device employs one or more sources of gas to pressurize metering capillaries containing liquid therein and to expel liquid therefrom. Further, capillary action may be employed in microfluidic devices to effect and control fluid movement as well.

As alluded to above, microfluidic devices may be made from a number of different materials. Materials are selected with regard to physical and chemical characteristics that are desirable for proper functioning of the microfluidic device. For example, the microfluidic device is typically from a material that enables formation of features of appropriate dimensions. That is, the material must be capable of microfabrication using, e.g., dry etching, wet etching, laser etching, laser ablation, molding, embossing, or the like, so as to have desired miniature surface features. Fluid-transporting features may be formed by adding materials to the base and/or cover plate. Suitable materials for forming microfluidic devices include, but are not limited to, semiconductors (e.g. silicon, gallium arsenide, etc.) polymeric materials, ceramics (including aluminum oxide and the like), glass, metals, composites, and laminates thereof.

Typically, rigid materials are employed in microfluidic devices. Rigid materials have generally been found to exhibit low acoustic attenuation and do not dissipate acoustic energy to an unacceptable degree. Thus, microfluidic devices for use with the present invention are typically formed from rigid materials, although elastomeric materials may also be used. See, e.g., WO01/01025 and Unger et al. (2000), "Monolithic Microfabricated Valves and Pumps by Multilayer Soft Lithography," *Science* 288:113–116, which describe Microfabricated elastomeric valve and pump systems.

Many elastic and compliant materials such as most silicone rubbers do not conduct acoustic energy efficiently, and they tend to be poor choices of materials from which to construct reservoirs. Typical attenuations for silicone rubbers are well over 1.0 dB/mm at 5 MHz. In view of the foregoing, elastomeric materials are not excluded as a class from use with the present invention although any elastic material used must be sufficiently conductive of acoustic energy. For example, one elastomer noted for its low acoustic attenuation is Aqualene™, described in Canadian Patent Application 2,127,039. This elastomer has an attenuation of 0.28 dB/mm at 5 MHz. Some microfluidic devices, however, are made from RTV 615 as described in U.S. Patent Application 20010029983. RTV 615 has an attenuation of 0.6 dB/mm at 5 MHz, which is significantly lower, although not as low as Aqualene™. RTV has also been shown to be useful for forming moldable focusing elements. See U.S. Pat. No. 6,301,055. Hence, RTV 615 is unusual in that it can serve as an elastomer for a microfluidic device, a focusing material and low attenuating acoustic material. This enables RTV 615 to serve as both the reservoir for containing a fluid sample resulting from processing in a microfluidic device, transferring acoustic energy generated outside of the material as well as optionally focusing the energy to location near the surface of the fluid sample.

While not wishing to be bound by theory, it is believed that the mechanical and acoustic properties of polymeric materials vary according to temperature. At low temperatures, i.e., temperatures below the material's glass transition temperature, the material tends to be rigid and tend to exhibit low acoustic attenuation. At a higher temperature, the material becomes leathery and tends to exhibit high acoustic attenuation. At a higher temperature still, the material becomes "rubbery" and tends to exhibit an acoustic attenuation between that of the rigid and rubbery states. At a higher temperature still, the material decomposes or melts.

In addition to materials selection, microfluidic devices may be constructed to enhance their suitability for use with acoustic ejection. For example, the thickness and flatness of the microfluidic devices may be selected to facilitate the uniform conveyance of acoustic energy into the fluid in the microfluidic device as to effect drop ejection from the fluid surface. Other construction parameters may be determined through routine experimentation.

Accordingly the invention also relates to a method and an apparatus for ejecting a fluid droplet from a microfluidic device. A microfluidic device as above is provided in conjunction with an ejector and a means for positioning the ejector in acoustic coupling relationship to the microfluidic device to eject a droplet from the outlet opening of the microfluidic device. As described supra, the ejector typically comprise an acoustic radiation generator for generating acoustic radiation and a focusing means for focusing the acoustic radiation at a focal point near the surface of a fluid at the outlet opening of the microfluidic device. Upon activation of the ejector, focused acoustic radiation is directed toward a point near the surface of a fluid at the outlet opening of the microfluidic device. As a result, a droplet of fluid is ejected from the outlet opening of the microfluidic device. Optionally, the droplet is ejected into an inlet opening of an additional microfluidic device or another sample vessel.

As discussed above, the invention is particularly useful in mass spectrometry, a sample analysis technique that provides great flexibility, speed, and precision. In particular, the invention is suited for use in surface-based mass spectrometric techniques such as MALDI. See Karas et al. (1988), "Laser Desorption Ionization of Proteins with Molecular Masses Exceeding 10,000 Daltons," *Anal. Chem.*, 60:2299–2301. MALDI involves the use of a laser to ionize an analyte within matrix material. The matrix material is usually a crystalline organic acid that absorbs electromagnetic radiation near the wavelength of the laser. When co-crystallized with analyte, the matrix material assists in the ionization and desorption of analyte moieties. MALDI techniques are particularly useful in providing a means for efficiently analyzing a large number of samples. In addition, MALDI is particularly useful in the analysis of very small amounts of sample that are optionally provided in a small area of substrate.

Unlike other mass spectrometric techniques that are extremely sensitive to salt contaminants and require sample purification prior to analysis (e.g., those employing electrospray sample introduction), MALDI provides an efficient technique for analysis of heterogeneous samples that may contain salt or other ions. Thus, analytical bottlenecks such as sample preparation and purification can be avoided.

In addition, the invention may be employed in conjunction with a variety of surface-based mass spectrometric techniques in addition to MALDI. For example, one variant of MALDI called SELDI uses affinity capture reagents such as antibodies to collect samples from a complex mixture, which allows in situ purification of the analyte followed by conventional MALDI analysis. In addition, surface-based mass spectrometry has been used to analyze single nucleotide polymorphisms in microarray formats (e.g., U.S. Pat. No. 6,322,970 to Little et al.)

Generally, the accuracy and reliability of surface-based spectrometric techniques require control over the formation of the sample matrix. For example, MALDI generally involves preparing a plurality of features in a matrix material, wherein each feature contains a sample molecule. The energy of laser photons is used to provide sufficient energy to ionize and desorb the sample molecules. However, to provide control of analyte ionization and desorption, it is preferred that the features are formed in a consistent manner. This typically requires the deposition of fluid droplets of substantially identical sizes on a substrate. For example, if the substrate already contains a matrix material, sample droplets containing the same concentration of analyte moieties and of a substantially identical size may be deposited as an array on the substrate. As another example, if the substrate already contains sample materials, identically sized droplets of one or more matrix materials may be deposited on selected sites to form features that facilitate sample ionization and desorption upon bombardment of laser photons. In either case, the matrix material enables the absorption of laser energy to volatilize and ionize the analyte while preventing analyte decomposition by absorbing significant amounts of laser energy.

In short, either or both of matrix materials and analyte are deposited on the substrate surface consistently and homogeneously to the substrate surface from site to site. If either the matrix material or the analyte is absent or is present in an inappropriate quantity at a feature, proper ionization will not take place, thereby resulting in inoperative or suboptimal MALDI performance. For example, when fluids are deposited manually to form features on a substrate or a sample surface, one can expect highly variable signal strengths from the different individual features. In many cases, no signal is detected. Moreover, manual deposition of fluid features does not typically enable the study of substructures in a sample wherein the sample features have a cross-sectional dimension of about 10–20 $\mu$m.

Acoustic ejection, as described above, allows highly reproducible quantities of MALDI matrix material, analyte, or another chemical entity to be deposited on regions of a substrate surface. As described in U.S. patent application Ser. No. 09/727,392, employment of acoustic ejection to dispense fluids results in consistency of feature shape, droplet directionality, and ejected volume that is unmatched by printing methods generally known in the art. Features containing matrix materials on the order of micrometers can be created. Due to the repeatability and precision in placement of droplets through acoustic ejection, additional matrix material may be added to any desired feature site. That is, for any feature site, matrix material may be incrementally deposited to ensure that the amount of matrix material at that feature site is optimized for data acquisition.

Thus, the invention also provides a method for preparing a plurality of sample molecules for analysis. Such preparation involves applying focused acoustic energy to each of a plurality of fluid-containing reservoirs, each of the reservoirs containing sample molecules in a fluid to be applied to a designated site on the substrate surface in order to prepare an array comprised of a plurality of sample molecules on a substrate surface. Array preparation involving nozzleless acoustic ejection has been described in detail in a number of patent applications. See, e.g., U.S. patent application Ser. No. 09/669,996, Ser. No. 09/669,997, and Ser. No. 09/669,267. In some instances, the array is allowed to dry and the sample molecules are allowed to adsorb/crystallize onto the substrate. In other instances, the sample molecules are attached to the substrate. Once the array is prepared, sufficient energy is successively applied to each site to ionize the sample molecules and release the sample molecules from the substrate surface for analysis. The energy may be applied, e.g., by bombarding the sites with photons (e.g., through use of a laser), electrons, and/or ions. Ionization and release of sample molecules may be enhanced through heating, directing focused acoustic energy to, and/or passing an electrical current through, at least one site. Once released, the ions may be directed to a mass analyzer in a manner described above or through other known techniques.

Furthermore, the invention provides a method for preparing a sample surface for analysis. The method involves first placing a sample surface in droplet-receiving relationship to a fluid-containing reservoir containing an analysis-enhancing fluid. Focused acoustic energy is then applied in a manner effective to eject a droplet of the analysis-enhancing fluid from the reservoir such that the droplet is deposited on the sample surface at a designated site. Finally, the sample is subjected to conditions sufficient to allow the analysis-enhancing fluid to interact with the sample surface to render the substrate surface at the designated site suitable for analysis. Optionally, sufficient energy is applied to the designated site to ionize the sample surface and to release sample molecules from the substrate surface for analysis.

In some instances, the analysis-enhancing fluid comprises an analysis-enhancing moiety and a carrier fluid. In such a case, the carrier fluid may be evaporated from the sample surface. Evaporation of the carrier fluid increases the local concentration of the analysis-enhancing moiety to effect interaction between analysis-enhancing moiety and the substrate surface. Depending on the type of analysis desired, any of a number of different types of interaction may take place between the analysis-enhancing moiety and the sample surface. For example, the analysis-enhancing moiety may be selected to break down or digest the constituents of the sample surface. As another example, the analysis-enhancing moiety may bind with selective moieties on the sample surface, thereby rendering the substrate surface suitable for analysis.

For MALDI or SELDI-type analysis, the analysis-enhancing fluid comprises a mass-spectrometry matrix material. Any of a number of photoabsorbing matrix materials known in the art may be employed, and examples of matrix materials for sample analysis include, but are not limited to, 6-aza-2-thiothymine, caffeic acid, 2,5-dihydroxybenzoic acid, a-cyano-4-hydroxy cinnamic acid, 3-hydroxypicolinic acid, and 2-pyrazinecarboxylic acid, and combinations thereof. A plurality of analysis-enhancing fluids may be applied to an analyte to optimize experimental parameters such as signal and reproducibility. Different sub-regions of a single sample could also be probed with a variety of matrices to enhance a particular component of interest. For example, 3-hydroxypicolinic acid is commonly used for the analysis of glycoproteins.

The invention is particularly suited for instances in which a plurality of droplets of one or more analysis-enhancing fluids is deposited on the sample surface. In some instances, the plurality of droplets is deposited on the sample surface at the same designated site. This technique provides control over the formation of the feature at the designated site. For example, if the droplets deposited at the same designated site contains different moieties, the concentration of the different moieties that form the feature can be controlled. In addition, the deposition of droplets at a designated site may correct for any potential deficiency in the presence of a required fluid at the site.

For example, in the context of mass spectrometry, the invention's ability to eject additional matrix material to designated sites that lack sufficient matrix material provides fine control over the amount of matrix material present at a designated site. In addition, because acoustic ejection allows for precise placement of ejected droplets, the location of matrix materials at the designated sites will be known with a higher degree of confidence.

As a result, there is no need for the laser to probe a sample multiple times simply to locate the analyte. Increasing the frequency of successful experiments greatly reduces the time for sample analysis, leading to greater sample throughput.

In addition or in the alternative, one or more droplets of analysis-enhancing fluid may be ejected onto the sample surface at different designated sites. In some instances, the different designated sites form an array. In such a case, because the analysis-enhancing fluid renders the designated sites more amenable for analysis, the analysis of the array would result in the analytical "imaging" of the sample surface. In addition, designated sites may correspond to sample regions of specific analytes. Since different analysis-enhancing fluids may specifically enhance one type of analyte over another, the experimenter could effectively analyze an impure sample. For example, if a mixture of nucleic acid and protein were deposited on a substrate, one could preferentially acquire a nucleic acid signal by the deposition of 2-amino-5-nitropyridine on the analyte, and then acquire a protein signal via the deposition of 6-aza-2-thiothymine. One could deposit the two analysis-enhancing fluids on two separate subregions of a single analyte region of a sample, or on two or more regions of the same analyte. A region is an area containing analyte which is not contiguous with an adjacent region. A subregion is an area of analyte within a non-contiguous region.

When MALDI-type analysis is carried out at these sites, sufficient energy is applied to the sites to ionize and release the sample molecules from the sample surface for analysis. This may involve bombarding a designated site with photons through the use of an optional laser. As discussed above, different regions of a single sample may be co-crystallized with a variety of matrices to facilitate the ionization of a particular component of interest.

It is noted that such an array may have a density substantially higher than that possible using current array preparation techniques, such as capillary microspotting and piezoelectric techniques (e.g., using inkjet printing technology). The array densities that may be achieved using the devices and methods of the invention are at least about 1,000,000 biomolecules per square centimeter of substrate surface, preferably at least about 1,500,000 per square centimeter of substrate surface. Also, the matrix can be precisely applied to a sample spot in increments of one picoliter or less, allowing an unparalleled degree of precision Once the array is prepared, sufficient energy is successively applied to each site to ionize and release the sample molecules from the substrate surface for analysis. The energy may be applied, e.g., by bombarding the sites with photons (e.g., through use of a laser), electrons, and/or ions. Ionization and release of sample molecules may be enhanced through heating, directing focused acoustic energy to, and/or passing an electrical current through, at least one site. Once released, the ions may be directed to a mass analyzer in a manner described above or through other known techniques.

It is to be understood that while the invention has been described in conjunction with the preferred specific embodiments thereof, that the foregoing description and the examples that follow are intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties.

EXAMPLE 1

A 2 nL fluid sample is loaded into a microfluidic device having a channel with an inlet opening wherein the opening has a limiting dimension of 25 μm. A 4 nL droplet of a micromolar solution of DNA oligomers is deposited on a flat surface of a polystyrene-coated glass substrate. The wetting angle between the sample solution and the polystyrene surface is 90°. As a result, the liquid is driven by surface tension to form a hemispherical reservoir having a diameter of 424 μm and height of 212 μm. Located 500 μm above the polystyrene surface and 288 μm from the apex of the hemisphere is the center of the inlet opening to the microfluidic channel.

A generator of focused acoustic energy is positioned below the substrate and coupled acoustically through water that serves as a coupling medium. Acoustic energy is generated at a frequency of approximately 140 MHz and focused below the apex of the hemispherical reservoir. By sending in periodic pulses of a few microseconds of acoustic energy, a series of identically sized and substantially spherical droplets, each having a 2 pL volume and about a 16 μm diameter, leave the reservoir and travel towards the inlet opening. A 250 Hz repetition rate of the pulse is generated, and 0.5 nL of the fluid sample per second is transferred through the opening as a result. The fluid transfer is continued until either the fluid depth becomes too shallow to support droplet formation or acoustic focus is lost. A reservoir having a depth of a few droplet diameters is sufficient to support droplet formation. Thus, for droplets having a diameter of 16 μm, ejection is stable for depths as little as 100 micrometers. That is, droplets having a diameter of 16 μm may be ejected from a hemispherical reservoir of fluid sample, wherein the diameter of the reservoir is under 200 μm. Hence, the original 4 nL hemisphere can be reduced in size by ejection of its fluid volume, leaving under about 12.5% of the original fluid volume. That is, less than 500 pL of fluid sample remains on the substrate surface after ejection, thereby resulting in a fluid sample delivery efficiency of about 87.5%.

EXAMPLE 2

A first microfluidic device is provided containing a microconduit having an upstream terminus and a downstream terminus. The microfluidic device from an acoustically a transparent material. An inlet opening is located at the upstream terminus and a reservoir is located at the downstream terminus. Also located at the downstream terminus is an outlet opening having a diameter of 250 μm above the reservoir. The thickness of the microfluidic device below the reservoir is 200 μm. Although the materials and dimensions associated with first microfluidic device may be altered somewhat, thick layers of highly attenuating materials are not preferred because it would be to generate and direct acoustic radiation at sufficient intensity to the fluid surface of the first microfluidic device to effect fluid transfer. When sufficient fluid has been introduced in to the reservoir, the depth of the fluid in the reservoir is 500 μm. An acoustic generator and focusing element are positioned and aligned below the microfluidic reservoir and in acoustic contact therewith.

A second microfluidic device is provided having an inlet opening with a limiting dimension of 300 μm and a reservoir in fluid communication therewith. The second microfluidic device may be constructed using the same or different materials from the first microfluidic device. The second microfluidic device is placed over the first microfluidic device, typically at a distance of no more than about a few millimeters. The two microfluidic devices are aligned such that the outlet opening of the first device is directly below the inlet opening of the second microfluidic device. Alignment of the outlet opening of the first device and the inlet opening of the second device may be verified by acoustic microscopy. If not aligned, relative positions of the microfluidic devices are altered to bring the two openings into alignment. Once aligned, sufficient acoustic energy, on the order of 140 MHz is applied to the reservoir of the first microfluidic device. The acoustic energy is applied for a few microseconds. As a result a droplet of approximately 2 pL in volume or about 16 μm in diameter is formed. The acoustic energy is also sufficient to force the droplet to travel a few millimeters, the distance between the two microfluidic devices. As a result, one or more fluid droplets introduced from the outlet opening of the first microfluidic device into the inlet opening of the second microfluidic device.

We claim:

1. A device for preparing a sample molecule, for processing and/or analysis, the improvement comprising employing:

a reservoir holding a fluid comprised of the sample molecule;

an ejector comprising an acoustic radiation generator for generating acoustic radiation and a focusing means for focusing the acoustic radiation at a focal point near the surface of the fluid; and a means for positioning the ejector in acoustic coupling relationship to the reservoir to eject a droplet of the fluid therefrom;

a substrate having a designated site on a surface thereof adapted to receive a droplet of fluid from the reservoir;

a mean for positioning the substrate relative to the reservoir so that the designated site on the substrate surface is placed in droplet-receiving relationship to the reservoir, thereby allowing deposition of the analyte molecule thereon; and a mean for applying energy to the designated site in a manner sufficient to ionize the analyte molecule and to release the analyte molecule from the substrate surface for analysis.

2. The device of claim 1, further comprising an ionization chamber in position to receive the ionized and released analyte molecule.

3. The device of claim 2, wherein the device is a mass spectrometer.

4. The device of claim 3, wherein the mass spectrometer is a time-of-flight mass spectrometer.

5. The device of claim 1, wherein the fluid occupies a volume of no more than about 100 μL.

6. The device of claim 5, wherein the fluid occupies a volume of no more than about 10 μL.

7. The device of claim 6, wherein the fluid occupies a volume of no more than about 1 μL.

8. The device of claim 7, wherein the fluid occupies a volume of about 10 pL to about 100 nL.

9. The device of claim 1, wherein the ejector is configured to eject a droplet having a volume of no more than about 1 nL.

10. The device of claim 9, wherein the ejector is configured to eject a droplet having a volume of no more than about 1 pL.

11. The device of claim 10, wherein the ejector is configured to eject a droplet having a volume of no more than about 100 fL.

12. The device of claim 1, wherein the ejector is configured to eject no more than about 5 percent of the fluid in the reservoir per droplet.

13. The device of claim 1, wherein the sample molecule has a molecular weight of about 100 daltons to about 100 kilodaltons.

14. The device of claim 13, wherein the molecular weight is about 1 to about 100 kilodaltons.

15. The device of claim 1, wherein the fluid further comprises water.

16. The device of claim 1, wherein the sample molecule is nonmetallic.

17. The device of claim 16, wherein the sample molecule is an organic compound.

18. The device of claim 17, wherein the organic compound is a biomolecule.

19. The device of claim 18, wherein the biomolecule is nucleotidic.

20. The device of claim 18, wherein the biomolecule is peptidic.

21. The device of claim 1, further comprising a detector for detecting reflected acoustic radiation from the fluid.

22. The device of claim 2, further comprising a charging means for electrically charging the fluid.

23. The device of claim 22, wherein the charging means is configured to electrically charge the surface of the fluid.

24. The device of claim 22, wherein the charging means is configured to electrically charge the entire fluid.

25. The device of claim 22, further comprising a charged surface within the ionization chamber that attracts or repels the droplet.

26. The device of claim 25, wherein the charged surface is a surface of a multipole analyzer.

27. The device of claim 26, wherein the multipole analyzer is a quadrupole analyzer.

28. The device of claim 2, wherein the reservoir is located within the ionization chamber.

29. The device of claim 1, wherein the sample vessel comprises a microfluidic device.

30. The device of claim 1, wherein the sample vessel represents a portion of a microfluidic device.

31. The device of claim 30, wherein the reservoir represents a portion of an additional microfluidic device.

32. The device of claim 1, wherein the means for applying energy comprises a source of photons, electrons, ions, or combinations thereof.

33. The device of claim 32, wherein the means for applying energy comprises a source of photons.

34. The device of claim 33, wherein the means for applying energy comprises a laser.

35. The device of claim 32, wherein the means for applying energy comprises a source of electrons.

36. The device of claim 32, wherein the means for applying energy comprises a source of ions.

37. A method for preparing a sample molecule for analysis, comprising:

(a) applying focused acoustic energy to a fluid-holding reservoir to eject a droplet of fluid containing a sample molecule therefrom to a designated site on a substrate surface; and (b) applying sufficient energy to site to ionize and release the sample molecule from the substrate surface for analysis.

38. The method of claim 37, wherein the sample molecule is introduced into a sample vessel of a device for processing and/or analyzing the sample molecule.

39. The method of claim 38, wherein the sample vessel is an ionization chamber.

40. The method of claim 39, wherein the device is a mass spectrometer.

41. The method of claim 40, wherein the mass spectrometer is a time-of-flight mass spectrometer.

42. The method of claim 37, further comprising repeating step (a).

43. The method of claim 42, wherein the ejected droplets are substantially identical in size.

44. The method of claim 42, wherein no more than about 5 percent of the fluid in the reservoir is ejected per droplet.

45. The method of claim 37, wherein the sample molecule has a molecular weight of about 100 daltons to about 100 kilodaltons.

46. The method of claim 45, wherein the molecular weight is about 1 to about 100 kilodaltons.

47. The method of claim 37, wherein the fluid further comprises water.

48. The method of claim 37, wherein the sample molecule is nonmetallic.

49. The method of claim 37, wherein the sample molecule an organic compound.

50. The method of claim 49, wherein the organic compound is a biomolecule.

51. The method of claim 50, wherein the biomolecule is nucleotidic.

52. The method of claim 50, wherein the biomolecule is peptidic.

53. The method of claim 37, further comprising, before step (a), (a') transmitting acoustic radiation through the fluid in the reservoir and detecting for reflected acoustic radiation.

54. The method of claim 38, wherein the sample vessel comprises a microfluidic device.

55. The method of claim 38, wherein the sample vessel represents a portion of a microfluidic device.

56. The method of claim 55, wherein the reservoir represents a portion of an additional microfluidic device.

57. The method of claim 37, wherein step (b) comprises bombarding at least one site with photons, electrons, ions, or combinations thereof.

58. The method of claim 57, wherein step (b) further comprises heating the at least one site.

59. The method of claim 57, wherein step (b) further comprises directing focused acoustic energy to at least one site.

60. The method of claim 57, wherein step (b) further comprises passing an electrical current through at least one site.

61. The method of claim 57, wherein step (b) comprises bombarding the site with photons.

62. The method of claim 61, wherein photonic bombardment is carried out using a laser.

63. The method of claim 37, wherein step (b) comprises bombarding the site with electrons.

64. The method of claim 37, wherein step (b) comprises bombarding the site with ions.

65. The method of claim 37, wherein step (b) comprises heating the site.

66. The method of claim 37, wherein step (b) comprises directing focused acoustic energy to the site.

67. The method of claim 37, wherein step (b) comprises passing an electrical current through the site.

68. The method of claim 37, further comprising, after step (b), determining the mass of the ionized sample molecule.

69. A device for preparing a contiguous sample surface for analysis:

a reservoir holding an analysis-enhancing fluid;

an ejector comprising an acoustic radiation generator for generating acoustic radiation and a focusing means for focusing the acoustic radiation at a focal point near the surface of the analysis-enhancing fluid; and a means for positioning the ejector in acoustic coupling relationship to the reservoir to eject a droplet of the analysis-enhancing fluid therefrom;

a sample having a designated site on a contiguous surface thereof adapted to receive a droplet of the analysis-enhancing fluid from the reservoir, wherein the designated site contains an analyte molecule;

a mean for positioning the sample so that designated site on the contiguous sample surface is placed in droplet-receiving relationship to the reservoir, thereby allowing deposition of the analysis-enhancing fluid thereon; and a mean for applying energy to the designated site in a manner sufficient to ionize the analyte molecule and to release the analyte molecule from the designated site for analysis.

70. The device of claim 69, further comprising an ionization chamber in position to receive the ionized and released analyte molecule.

71. The device of claim 70, wherein the device is a mass spectrometer.

72. The device of claim 69, comprising a plurality of reservoirs are arranged in an array.

73. The device of claim 69, comprising a plurality of reservoirs provided as integrated members of a single substrate.

74. The device of claim 73, wherein the reservoirs comprise designated sites on a surface of the substrate surface.

75. The device of claim 74, wherein the substrate surface is substantially flat.

76. The device of claim 69, wherein the sample molecule is a biomolecule.

77. The device of claim 69, further comprising a detector for detecting reflected acoustic radiation from the fluid in the reservoir.

78. The device of claim 70, further comprising a charged surface within the ionization chamber.

79. The device of claim 78, wherein the charged surface is a surface of a multipole analyzer.

80. The device of claim 79, wherein the multipole analyzer is a quadrupole analyzer.

81. The device of claim 69, wherein the device comprises 96 reservoirs.

82. The device of claim 81, wherein the device comprises 384 reservoirs.

83. The device of claim 82, wherein the device comprises 1536 reservoirs.

84. The device of claim 69, further comprising a microfluidic device in position to receive the ionized and released analyte molecule.

85. The device of claim 69, wherein the means for applying energy comprises a source of photons, electrons, ions, or combinations thereof.

86. The device of claim 85, wherein the means for applying energy comprises a source of photons.

87. The device of claim 86, wherein the means for applying energy comprises a laser.

88. The device of claim 85, wherein the means for applying energy comprises a source of electrons.

89. The device of claim 85, wherein the means for applying energy comprises a source of ions.

90. A method for preparing a contiguous sample surface for analysis, comprising:

(a) providing a reservoir holding an analysis-enhancing fluid;

(b) providing a sample having a contiguous surface such that a designated site thereon is placed in droplet-receiving relationship to the fluid holding reservoir; and (c) applying focused acoustic energy in a manner effective to eject a droplet of the analysis-enhancing fluid from the reservoir such that the droplet is deposited on the sample surface at the designated site; and (d) subjecting the sample to conditions sufficient to allow the analysis-enhancing fluid to interact with the sample surface at the designated site to render the sample surface at the designated site suitable for analysis.

91. The method of claim 90, wherein the analysis-enhancing fluid comprises an analysis-enhancing moiety and a carrier fluid.

92. The method of claim 90, wherein the carrier fluid is evaporated from the sample surface in step (d).

93. The method of claim 90, wherein the analysis-enhancing fluid is solidified on the sample surface in step (d).

94. The method of claim 90, wherein the analysis-enhancing fluid comprises a mass-spectrometry matrix material.

95. The method of claim 94, wherein the mass-spectrometry matrix material is a photoabsorbing matrix material.

96. The method of claim 90, wherein step (c) is repeated such that a plurality of droplets is deposited on the sample surface.

97. The method of claim 96, wherein the plurality of droplets is deposited on the sample surface at the same designated site.

98. The method of claim 96, wherein the plurality of droplets is deposited on the sample surface at different designated sites.

99. The method of claim 98, wherein the different designated sites form an array.

100. The method of claim 96, wherein step (a) comprises providing a plurality of reservoirs each holding a different analysis-enhancing fluid and step (c) comprises applying focused acoustic energy in a manner effective to eject a droplet of fluid from each reservoir such that the droplets are deposited on the sample surface.

101. The method of claim 90, further comprising, after step (d), (e) applying sufficient energy to the designated site to ionize and release a sample molecule from the designated site of the sample surface for analysis.

102. The method of claim 101, wherein step (e) comprises bombarding the designated site with photons, electrons, ions, or combinations thereof.

103. The method of claim 102, wherein step (e) further comprises heating the designated site.

104. The method of claim 102, wherein step (e) further comprises directing focused acoustic energy to the designated site.

105. The method of claim 102, wherein step (e) further comprises passing an electrical current through the designated site.

106. The method of claim 102, wherein step (e) comprises bombarding the designated site with photons.

107. The method of claim 106, wherein photonic bombardment is carried out using a laser.

108. The method of claim 101, further comprising, after step (e), (f) determining the molecular weight of the ionized sample molecules.

* * * * *